(12) United States Patent
Chin

(10) Patent No.: US 12,225,541 B2
(45) Date of Patent: Feb. 11, 2025

(54) METHOD AND USER EQUIPMENT FOR HYBRID AUTOMATIC REPEAT REQUEST PROCESS IDENTITY SELECTION

(71) Applicant: SHARP KABUSHIKI KAISHA, Sakai (JP)

(72) Inventor: Heng-Li Chin, Taipei (TW)

(73) Assignee: SHARP KABUSHIKI KAISHA, Sakai (JP)

(*) Notice: Subject to any disclaimer, the term of this patent is extended or adjusted under 35 U.S.C. 154(b) by 302 days.

(21) Appl. No.: 17/716,300

(22) Filed: Apr. 8, 2022

(65) Prior Publication Data

US 2022/0338241 A1 Oct. 20, 2022

Related U.S. Application Data

(60) Provisional application No. 63/173,240, filed on Apr. 9, 2021.

(51) Int. Cl.
*H04W 72/23* (2023.01)
*H04L 1/1812* (2023.01)
(Continued)

(52) U.S. Cl.
CPC ........... *H04W 72/23* (2023.01); *H04L 1/1812* (2013.01); *H04W 72/1268* (2013.01); *H04W 72/566* (2023.01); *H04W 80/02* (2013.01)

(58) Field of Classification Search
CPC ............. H04W 72/23; H04W 72/1268; H04W 72/566; H04W 80/02; H04L 1/1812
See application file for complete search history.

(56) References Cited

U.S. PATENT DOCUMENTS

2018/0159668 A1 6/2018 Phuyal et al.
2019/0289638 A1* 9/2019 Kung ................ H04W 74/0833
(Continued)

FOREIGN PATENT DOCUMENTS

WO 2020192624 A1 10/2020
WO 2021027917 2/2021

OTHER PUBLICATIONS

Ericsson, CG timer handling upon de-prioritization of bundled Pusch, 3GPP TSG-RAN WG2 #113bis-e, Electronic meeting, Apr. 12, 2021-Apr. 20, 2021, Tdoc R2-2103427, the whole document.
(Continued)

*Primary Examiner* — Deepa Belur
(74) *Attorney, Agent, or Firm* — ScienBiziP, P.C.

(57) ABSTRACT

A method and a user equipment for HARQ process ID selection are provided. The method includes: receiving a configuration message to configure a Configured Grant (CG) configuration and a set of HARQ process IDs that is available for the CG configuration, the set of HARQ process IDs including a first HARQ process ID for retransmission and a second HARQ process ID for initial transmission; determining that a CG physical uplink shared channel (PUSCH) corresponding to the CG configuration becomes available for transmission; selecting, based on a first HARQ process ID selection procedure, the first HARQ process ID or the second HARQ process ID from the set of HARQ process IDs for the CG PUSCH; and transmitting, based on the selected first or second HARQ process ID, a first Medium Access Control (MAC) Protocol Data Unit (PDU) for retransmission or a second MAC PDU for initial transmission on the CG PUSCH.

12 Claims, 8 Drawing Sheets

(51) Int. Cl.
*H04W 72/1268* (2023.01)
*H04W 72/566* (2023.01)
*H04W 80/02* (2009.01)

(56) References Cited

U.S. PATENT DOCUMENTS

| | | | |
|---|---|---|---|
| 2020/0154469 A1 | 5/2020 | Chin et al. | |
| 2021/0105096 A1 | 4/2021 | Chin et al. | |
| 2022/0158765 A1* | 5/2022 | Lu | H04L 1/1887 |
| 2022/0158769 A1 | 5/2022 | Gou et al. | |
| 2022/0294576 A1* | 9/2022 | Kuo | H04L 1/1822 |
| 2023/0058734 A1* | 2/2023 | Xiao | H04L 1/1812 |
| 2023/0198678 A1* | 6/2023 | Fu | H04L 5/0055 |
| | | | 370/329 |
| 2023/0269772 A1* | 8/2023 | Chen | H04W 74/0808 |
| | | | 370/329 |
| 2024/0014951 A1* | 1/2024 | Loehr | H04L 5/0064 |

OTHER PUBLICATIONS

CMCC, Discussion on the remaining issue for uplink enhancements for URLLC in UCE, 3GPP TSG-RAN WG2 # 113bis electronic, Online, Apr. 12-Apr. 20, 2021, R2-2103688, the whole document.
3GPP TR 38.889, "3rd Generation Partnership Project; Technical Specification Group Radio Access Network; Study on NR-based access to unlicensed spectrum (Release 16)", V16.0.0 (Dec. 2018).
3GPP TS 38.213 "3rd Generation Partnership Project; Technical Specification Group Radio Access Network; NR; Physical layer procedures for control (Release 16)", V16.4.0 (Dec. 2020).
3GPP TS 38.214, "3rd Generation Partnership Project; Technical Specification Group Radio Access Network; NR; Physical layer procedures for data (Release 16)", V16.2.0 (Jun. 2020).
3GPP TS 38.212, "3rd Generation Partnership Project; Technical Specification Group Radio Access Network; NR; Multiplexing and channel coding (Release 16)", V16.2.0 (Jun. 2020).
3GPP TS 38.331, "3rd Generation Partnership Project; Technical Specification Group Radio Access Network; NR; Radio Resource Control (RRC) protocol specification (Release 16)", V16.1.0 (Jul. 2020).
Nokia, Nokia Shanghai Bell, "Revised WID: Enhanced Industrial Internet of Things (IoT) and ultra-reliable and low latency communication (URLLC) support for NR", 3GPP TSG RAN Meeting #88e Electronic meeting, Jun. 29-Jul. 3, 2020, RP-201310.
3GPP TS 38.321, "3rd Generation Partnership Project; Technical Specification Group Radio Access Network; NR; Medium Access Control (MAC) protocol specification (Release 16)", V16.3.0 (Dec. 2020).
3GPP TS 38.211, "3rd Generation Partnership Project; Technical Specification Group Radio Access Network; NR; Physical channels and modulation (Release 16)", V16.2.0 (Jun. 2020).
3GPP TS 37.213, "3rd Generation Partnership Project; Technical Specification Group Radio Access Network; Physical ayer procedures for shared spectrum channel access (Release 16)", V16.2.0 (Jun. 2020).

* cited by examiner

METHOD AND USER EQUIPMENT FOR HYBRID AUTOMATIC REPEAT REQUEST PROCESS IDENTITY SELECTION

CROSS-REFERENCE TO RELATED APPLICATION(S)

The present disclosure claims the benefit of and priority to U.S. Provisional Patent Application Ser. No. 63/173,240, filed on Apr. 9, 2021, entitled "METHOD AND APPARATUS TO SUPPORT URLLC IN UNLICENSED AND CONTROLLED ENVIRONMENT," the content of which is hereby fully incorporated by reference into the present disclosure for all purposes.

FIELD

The present disclosure is related to wireless communication and, more particularly, to a method and a user equipment (UE) for hybrid automatic repeat request (HARQ) identity (ID) selection in next generation wireless communication networks.

BACKGROUND

Various efforts have been made to improve different aspects of wireless communication for cellular wireless communication systems, such as 5G New Radio (NR), by improving data rate, latency, reliability, and mobility. The 5G NR system is designed to provide flexibility and configurability to optimize network services and types, accommodating various use cases such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art.

SUMMARY

The present disclosure is related to a method and a user equipment for hybrid automatic repeat request (HARQ) identity (ID) selection in next generation wireless communication networks.

In a first aspect of the present disclosure, a method performed by a user equipment (UE) for HARQ ID selection is provided. The method includes: receiving a configuration message to configure a Configured Grant (CG) configuration and a set of HARQ process IDs that is available for the CG configuration, the set of HARQ process IDs including a first HARQ process ID for retransmission and a second HARQ process ID for initial transmission; determining that a CG physical uplink shared channel (PUSCH) corresponding to the CG configuration becomes available for transmission; selecting, based on a first HARQ process ID selection procedure, the first HARQ process ID or the second HARQ process ID from the set of HARQ process IDs for the CG PUSCH; and transmitting, based on the selected first or second HARQ process ID, a first Medium Access Control (MAC) Protocol Data Unit (PDU) for the retransmission or a second MAC PDU for the initial transmission on the CG PUSCH. The first HARQ process ID selection procedure includes: determining a priority of first data multiplexed in the first MAC PDU as a first priority of the first HARQ process ID; determining a priority of second data to be multiplexed in the second MAC PDU as a second priority of the second HARQ process ID; selecting, based on the first priority and the second priority, the first HARQ process ID or the second HARQ process ID from the set of HARQ process IDs for the CG PUSCH; and prioritizing the first HARQ process ID over the second HARQ process ID in a case that the first priority is equal to the second priority.

In an implementation of the first aspect of the present disclosure, the first data is from a first set of Logical Channels (LCHs), the second data is from a second set of LCHs, the priority of the first data is determined based on an LCH with a highest LCH priority among the first set of LCHs, and the priority of the second data is determined based on an LCH with a highest LCH priority among the second set of LCHs.

In an implementation of the first aspect of the present disclosure, the first HARQ process ID selection procedure further includes: selecting the first HARQ process ID for the CG PUSCH in a case that the first priority is higher than the second priority; and selecting the second HARQ process ID for the CG PUSCH in a case that the second priority is higher than the first priority.

In an implementation of the first aspect of the present disclosure, the method further includes: selecting, based on the first HARQ process ID selection procedure, the first HARQ process ID or the second HARQ process ID from the set of HARQ process IDs for the CG PUSCH in a case that a Logical Channel (LCH)-based prioritization indication, a CG retransmission timer, and an Information Element (IE) for enabling the first HARQ process ID selection procedure are configured.

In an implementation of the first aspect of the present disclosure, the IE is configured for the CG configuration or for a MAC entity of the UE.

In an implementation of the first aspect of the present disclosure, the method further includes: selecting, based on a second HARQ process ID selection procedure, the first HARQ process ID or the second HARQ process ID from the set of HARQ process IDs for the CG PUSCH in a case that at least one of the LCH-based prioritization indication, the CG retransmission timer, and the IE is not configured. The second HARQ process ID selection procedure includes: prioritizing the first HARQ process ID over the second HARQ process ID.

In an implementation of the first aspect of the present disclosure, prioritizing the first HARQ process ID over the second HARQ process ID comprises: selecting the first HARQ process ID for the CG PUSCH.

In a second aspect of the present disclosure, a UE for HARQ ID selection is provided. The UE includes one or more non-transitory computer-readable media having computer-executable instructions embodied thereon; and at least one processor coupled to the one or more non-transitory computer-readable media. The at least one processor is configured to execute the computer-executable instructions to: receive a configuration message to configure a Configured Grant (CG) configuration and a set of HARQ process IDs that is available for the CG configuration, the set of HARQ process IDs including a first HARQ process ID for retransmission and a second HARQ process ID for initial transmission; determining that a CG physical uplink shared channel (PUSCH) corresponding to the CG configuration becomes available for transmission; select, based on a first HARQ process ID selection procedure, the first HARQ process ID or the second HARQ process ID from the set of HARQ process IDs for the CG PUSCH; and transmit, based on the selected first or second HARQ process ID, a first Medium Access Control (MAC) Protocol Data Unit (PDU) for the retransmission or a second MAC PDU for the initial transmission on the CG PUSCH, wherein the first HARQ process ID selection procedure includes: determining a priority of first data multiplexed in the first MAC PDU as a first priority of the first HARQ process ID; determining a priority of second data to be multiplexed in the second MAC PDU as a second priority of the second HARQ process ID; selecting, based on the first priority and the second priority, the first HARQ process ID or the second HARQ process ID from the set of HARQ process IDs for the CG PUSCH; and prioritizing the first HARQ process ID over the second HARQ process ID in a case that the first priority is equal to the second priority.

BRIEF DESCRIPTION OF THE DRAWINGS

Aspects of the disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
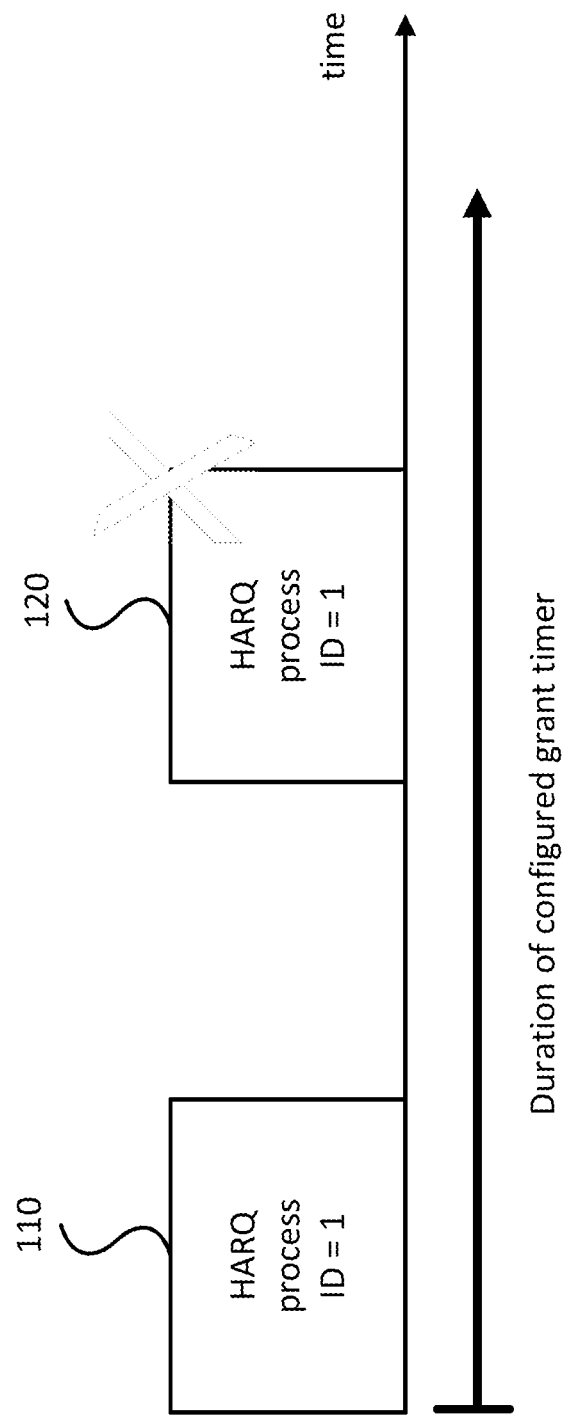
FIG. 1 is a schematic diagram illustrating a configured grant (CG) timer operation in new radio (NR), according to an example implementation of the present disclosure.

The acronyms in the present application are defined as follows, unless otherwise specified:

| Acronym | Full name |
| --- | --- |
| 3GPP | $3^{rd}$ Generation Partnership Project |
| 5G | $5^{th}$ generation |
| 5GC | 5G Core |
| ACK | Acknowledgement |
| ASIC | Application Specific Integrated Circuitry |
| ATG | Air-To-Ground |
| BDS | Beidou Navigation Satellite System |
| BLER | Block Error Rate |
| BS | Base Station |
| BSC | BS Controller |
| BSD | Buffer Size Duration |
| BWP | Bandwidth Part |
| CA | Carrier Aggregation |
| CBRA | Contention-Based Random Access |
| CC | Component Carrier |
| CCA | Clear Channel Assessment |
| CCCH | Common Control Channel |
| CD-ROM | Compact Disc Read-Only Memory |
| CE | Control Element |
| CFRA | Contention Free Random Access |
| CG | Configured Grant |
| CG | Cell Group |
| CN | Core Network |
| COT | Channel Occupancy Time |
| CP | Cyclic Prefix |
| CRC | Cyclic Redundancy Check |
| CRID | Contention Resolution Identity |
| C-RNTI | Cell-Radio Network Temporary Identifier |
| CI-RNTI | Cancellation Indication-RNTI |
| CS-RNTI | Configured Scheduling-RNTI |
| CSI | Channel State Information |
| dB | Decibel |
| DC | Dual Connectivity |
| DCI | Downlink Control Information |
| DFI | Downlink Feedback Information |
| DL | Downlink |
| DL-SCH | Downlink-Shared Channel |
| DMRS | Demodulation Reference Signal |
| DRX | Discontinuous Reception |
| DSP | Digital Signal Processor |
| e-LTE | evolved LTE |
| E-UTRA | Evolved Universal Terrestrial Radio Access |
| E-UTRAN | Evolved Universal Terrestrial Radio Access Network |
| EDGE | Enhanced Data rates for GSM Evolution |
| EEPROM | Electrically Erasable Programmable Read-Only Memory |
| eMBB | enhanced Mobile Broadband |

-continued

| Acronym | Full name |
| --- | --- |
| eMTC | massive Machine-Type Communication |
| EPC | Evolved Packet Core |
| EPROM | Erasable Programmable Read-Only Memory |
| FBE | Frame based equipment |
| FFP | Fixed Frame Period |
| GC-PDCCH | Group Common Physical Downlink Control Channel |
| GEO | Geostationary Earth Orbit |
| GERAN | EDGE RAN |
| GLONASS | Global Navigation Satellite System |
| gNB | Next Generation Node B |
| GNSS | Global Navigation Satellite System |
| GPRS | General Packet Radio Service |
| GPS | Global Positioning System |
| GSM | Global System for Mobile communication |
| HAPS | High Altitude Platform Station |
| HARQ | Hybrid Automatic Repeat request |
| HSPA | High-Speed Packet Access |
| ID | Identifier |
| IE | Information Element |
| IIoT | Industrial Internet of Things |
| LAA | Licensed Assisted Access |
| LBT | Listen Before Talk |
| LCH | Logical Channel |
| LCID | Logical Channel Identity |
| LCP | Logical Channel Prioritization |
| LDPC | Low-Density Parity-Check |
| LEO | Low Earth Orbit |
| LSB | Least Significant Bit |
| LTE | Long-Term Evolution |
| LTE-A | LTE-Advanced |
| L1 | Layer 1 |
| MAC | Medium Access Control |
| MCG | Master Cell Group |
| MCS-C-RNTI | Modulation Coding Scheme Cell Radio Network Temporary Identifier |
| MEO | Medium Earth Orbit |
| MIMO | Multi-input Multi-output |
| MSB | Most Significant Bit |
| Msg | Message |
| NACK | Negative Acknowledgment |
| NAS | Non-Access Stratum |
| NDI | New Data Indicator |
| NGEO | Non-Geostationary Earth Orbit |
| NGSO | Non-Geosynchronous Orbit |
| NR | New RAT/Radio |
| NR-U | New Radio Unlicensed |
| NTN | Non-Terrestrial Network |
| NW | Network |
| OFDM | Orthogonal Frequency-Division Multiplexing |
| PBCH | Physical Broadcast Channel |
| PBR | Prioritized Bit Rate |
| PCell | Primacy Cell |
| PDCCH | Physical Downlink Control Channel |
| PDCP | Packet Data Convergence Protocol |
| PDSCH | Physical Downlink Shared Channel |
| PDU | Protocol Data Unit |
| PHY | Physical |
| PRACH | Physical Random Access Channel |
| PRB | Physical Resource Block |
| PRU | PUSCH Resource Unit |
| ProSe | Proximity Service |
| PSCell | Primary Secondary Cell |
| PUCCH | Physical Uplink Control Channel |
| PUSCH | Physical Uplink Shared Channel |
| PO | PUSCH Occasion |
| QoS | Quality of Service |
| RA | Random Access |
| RACH | Random Access Channel |
| RAM | Random Access Memory |
| RAN | Radio Access Network |
| RAR | Random Access Response |
| RAT | Radio Access Technology |
| Rel | Release |
| RLAN | Radio Local Area Network |
| REC | Radio Link Control |
| RMSI | Remaining Minimum System Information |
| RNC | Radio Network Controller |
| RNTI | Radio Network Temporary Identifier |

-continued

| Acronym | Full name |
| --- | --- |
| RO | PRACH Occasion |
| ROM | Read Only Memory |
| RRC | Radio Resource Control |
| RSRP | Reference Signal Received Power |
| RTT | Round Trip Time |
| RV | Redundancy Version |
| SCell | Secondary Cell |
| SCG | Secondary Cell Group |
| SCS | Subcarrier Spacing |
| SDAP | Service Data Adaptation Protocol |
| SDU | Service Data Unit |
| SFN | System Frame Number |
| SI | System Information |
| SL | Sidelink |
| SL-SCH | Sidelink-Shared Channel |
| SN | Sequence Number |
| SpCell | Special Cell |
| SPS | Semi-Persistent Scheduling |
| SR | Scheduling Request |
| SRS | Sounding Reference Signal |
| SS | Search Space |
| SSB | Synchronization Signal Block |
| SUL | Supplementary Uplink |
| TA | Timing Advance |
| TAG | Timing Advance Group |
| TB | Transport Block |
| TBS | Transport Block Size |
| TC-RNTI | Temporary C-RNTI |
| TPC | Transmit Power Control |
| TR | Technical Report |
| TS | Technical Specification |
| TX | Transmission |
| TRP | Transmission and Reception Point |
| UCE | Unlicensed Controlled Environment |
| UCI | Uplink Control Information |
| UE | User Equipment |
| UL | Uplink |
| UL-SCH | Uplink-Shared Channel |
| UMTS | Universal Mobile Telecommunications System |
| URLLC | Ultra-Reliable and Low-Latency Communication |
| V2X | Vehicle to Everything |
| W-CDMA | Wideband-Code Division Multiple Access |
| WG | Working Group |
| WI | Working Item |
| WiMAX | Worldwide Interoperability for Microwave Access |

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art. Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series or equivalent. The expression "at least one of A, B and C" or "at least one of the following: A, B and C" means "only A, or only B, or only C, or any combination of A, B and C."

For the purposes of explanation and non-limitation, specific details such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof. A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s). The microprocessors or general-purpose computers may include Application-Specific Integrated Circuits (ASICs), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure.

The computer-readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture, such as a Long-Term Evolution (LTE) system, an LTE-Advanced (LTE-A) system, an LTE-Advanced Pro system, or a 5G NR Radio Access Network (RAN), typically includes at least one base station (BS), at least one UE, and one or more optional network elements that provide connection within a network. The UE communicates with the network, such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

ABS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage. Each cell (often referred to as a serving cell) may provide services to one or more UEs within its radio coverage such that each cell schedules the DL and optionally UL resources to at least one UE within its radio coverage for DL and optionally UL packet transmissions. The BS can communicate with one or more UEs in the radio communication system via the plurality of cells. A cell may allocate sidelink (SL) resources for supporting Proximity Service (ProSe) or Vehicle to Everything (V2X) service. Each cell may have overlapped coverage areas with other cells.

As discussed above, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate, and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used. Additionally, two coding schemes are considered for NR, specifically Low-Density Parity-Check (LDPC) code and Polar Code. The coding scheme adaption may be configured based on channel conditions and/or service applications.

Moreover, it is also considered that in a transmission time interval TX of a single NR frame, downlink (DL) transmission data, a guard period, and uplink (UL) transmission data should at least be included, where the respective portions of the DL transmission data, the guard period, and the UL transmission data should also be configurable, for example, based on the network dynamics of NR. In addition, sidelink resources may also be provided in an NR frame to support ProSe services.

In addition, the terms "system" and "network" herein may be used interchangeably. The term "and/or" herein is only an association relationship for describing associated objects and represents that these relationships may exist. For example, A and/or B may indicate that: A exists alone, A and B exist at the same time, or B exists alone. In addition, the character "/" herein generally represents that the former and latter associated objects are in an "or" relationship.

Examples of some selected terms are provided as follows.

A network may be a fixed station or base station used for communicating with the terminals and may also be referred to as an access point, a Node B, a base station, an enhanced base station, an eNodeB, a gNodeB (gNB), or some other terminology.

An unlicensed environment may be referred to as a shared spectrum, an unlicensed spectrum, and/or an unlicensed band, a cell that operates with shared spectrum channel access, etc.

A CG may include a PCell, a PSCell, and/or a SCell.

An SpCell may include a PCell and a PSCell.

A UL resource may include a RACH resource, a PUCCH resource, and/or a PUSCH resource. The UL resource may be scheduled by dynamic grant (e.g., via PDCCH) and/or configured by RRC (e.g., type 1/type 2 configured UL grant or pre-configured in an RRC configuration).

The MAC entity may be referred to as the UE.

Intra-UE prioritization may be needed if two or more UL resources (scheduled/configured in the same serving cell) overlap in the time domain, in which a UE selects one of the overlapping UL resources for transmission.

The overlap of the resources may mean the resources partially overlap and/or fully overlap.

The configured grant configuration may include (but is not limited to) a configured grant Type 1 or a configured grant Type 2.

There are two types of transmission without dynamic grant:

(a) Configured grant Type 1, where an uplink grant is provided by an RRC message and stored as a configured uplink grant.

(b) Configured grant Type 2, where an uplink grant is provided by a PDCCH and stored or cleared as a configured uplink grant based on L1 signaling indicating configured uplink grant activation or deactivation.

A configured uplink grant may be referred to as a PUSCH resource that corresponds to a configured grant configuration.

A CG PUSCH may be referred to as a PUSCH that corresponds to a configured grant configuration.

A HARQ-ACK may be either an ACK or a NACK.

The UE may consider a generated MAC PDU/TB as being obtained.

Frame Based Equipment (FBE) may implement a Listen Before Talk (LBT)-based Channel Access Mechanism to detect the presence of other Radio Local Area Network (RLAN) transmissions on an operating channel.

In some implementations of the present disclosure, intra-UE prioritization may be needed by a UE if two or more UL resources (scheduled/configured in the same serving cell) overlap in the time domain. As a result of the intra-UE prioritization, the UE may select one of the overlapping UL resources for transmission. The selected UL resource may be referred to as the prioritized UL resource, and the MAC PDU/TB to be transmitted on the UL resource may be referred to as the prioritized MAC PDU/TB. In contrast, the UL resource(s) that are not selected may be referred to as the deprioritized UL resource(s), and the MAC PDU(s)/TB(s) to be transmitted on the deprioritized UL resource(s) may be referred to as the deprioritized MAC PDU(s)/TB(s).

Either the network may indicate to a UE, or the UE may determine itself, whether to use a Type 1 channel access procedure or a Type 2 channel access procedure before performing a UL transmission. Specifically, a Type 2 channel access procedure may be further classified into a Type 2A, Type 2B, Type 2C, or Type 2D channel access procedure, as specified in 3GPP TS 37.213.

A channel occupancy initiated by an initiating device (e.g., gNB) and shared with a responding device (e.g., UE) may satisfy the following conditions (a)-(e).

(a) The initiating device (e.g., gNB) may transmit a DL (or UL) transmission burst(s) starting at the beginning of the COT immediately after performing channel access and sensing the channel to be idle for at least a sensing slot duration $T\_sl=9$ μs. If the channel is sensed to be busy (after performing channel access), the initiating device (e.g., gNB) may not perform any transmission during the current COT.

(b) The initiating device (e.g., gNB) may transmit a DL (or UL) transmission burst(s) within the COT immediately after performing channel access and sensing the channel to be idle for at least a sensing slot duration $T\_sl=9$ μs if the gap between the DL (or UL) transmission burst(s) and any previous transmission burst is more than 16 μs.

(c) The initiating device (e.g., gNB) may transmit DL (or UL) transmission burst(s) after UL (or DL) transmission burst(s) within the COT without performing channel access/sensing the channel if the gap between the DL (or UL) and UL (or DL) transmission bursts is at most 16 μs.

(d) A responding device (e.g., UE) may transmit UL (or DL) transmission burst(s) after detection of a DL (or UL) transmission burst(s) within the COT (acquired by the initiating device) as follows. If the gap between the UL (or DL) and DL (or UL) transmission bursts is at most 16 μs, the responding device (e.g., UE) may transmit UL (or DL) transmission burst(s) after a DL (or UL) transmission burst(s) within the COT (acquired by the initiating device) without performing channel access/sensing the channel. If the gap between the UL (or DL) and DL (or UL) transmission bursts is more than 16 μs, the responding device (e.g., UE) may transmit UL (or DL) transmission burst(s) after a DL (or UL) transmission burst(s) within the COT (acquired by the initiating device) after performing channel access and sensing the channel to be idle for at least a sensing slot duration $T\_sl=9$ μs within a 25 μs interval ending immediately before transmission.

(e) The initiating device (e.g., gNB) and responding devices (e.g., UEs) may not transmit any transmissions in a set of consecutive symbols for a duration of at least $T\_z=\max(0.05T\_x, 100$ μs$)$ before the start of the next COT.

If a UE fails to access the channel(s) (e.g., LBT failure) prior to an intended UL transmission to a network, Layer 1 (e.g., PHY) notifies higher layers (e.g., MAC) about the channel access failure (e.g., by sending an LBT failure indication).

When the timer cg-RetransmissionTimer is configured and the HARQ entity obtains a MAC PDU to transmit, the corresponding HARQ process is considered to be pending. For a configured uplink grant configured with cg-RetransmissionTimer, each associated HARQ process is considered as not pending when any of the following conditions (a)-(c) is satisfied.

(a) A transmission is performed on the HARQ process and an LBT failure indication is not received from lower layers.

(b) The configured uplink grant is initialized and the HARQ process is not associated with another active configured uplink grant.

(c) A HARQ buffer for the HARQ process is flushed.

A HARQ process ID (of a configured grant configuration) may be considered for retransmission if either of the following conditions (a) and (b) is satisfied.

(a) The timer configuredGrantTimer of the HARQ process ID is running (and the HARQ process is pending/not pending).

(b) The configuredGrantTimer for the HARQ process ID is not running and the HARQ process is pending.

A HARQ process (of a configured grant configuration) may be considered for new transmission (e.g., initial transmission) if the configuredGrantTimer of the HARQ process ID is not running (and the HARQ PROCESS ID is not pending).

A UL resource may also be referred to as a UL grant.

If lch-BasedPrioritization is configured at a UE, LCH-based prioritization may be performed by the UE when two or more UL resources (e.g., one or more PUSCH resources and/or one or more PUCCH resources for SR transmission) overlap in the time-domain (in the same serving cell). As a result of LCH-based prioritization, the UE may determine one prioritized UL resource out of the time-domain overlapping UL resources for transmission. Moreover, the UE may determine the UL resource(s) that overlaps the prioritized UL resource as a deprioritized UL resource(s).

If autonomousTx is configured in a CG configuration, in the case that a deprioritized UL resource is a CG PUSCH from the CG configuration, namely CG PUSCH-deprioritized, a generated MAC PDU for the HARQ process of CG PUSCH-deprioritized may be autonomously transmitted on the next available CG PUSCH for new transmission, namely CG PUSCH-autonomousTx. In some implementations, CG PUSCH-deprioritized and CG PUSCH-autonomousTx may have the same HARQ process ID, CG configuration, and TBS as the deprioritized CG PUSCH. Note that autonomousTx may need to be configured in the same CG configuration as the CG PUSCH-deprioritized (and CG PUSCH-autonomousTx) to enable autonomous transmission of the deprioritized MAC PDU.

If cg-RetransmissionTimer is configured in a CG configuration and the UE has a pending HARQ process ID due to LBT failure (e.g., detection of an LBT failure indication) before transmission on a CG PUSCH, namely CG PUSCH-LBT Failure, a generated MAC PDU for the HARQ process of CG PUSCH-LBT Failure may be retransmitted on a CG PUSCH for retransmission, namely CG PUSCH-retransmission, when cg-RetransmissionTimer for the HARQ process of CG PUSCH-LBT is not running. In some implementations, CG PUSCH-LBT Failure and CG PUSCH-retransmission may have the same HARQ process ID and TBS as the deprioritized CG PUSCH. In some implementations, cg-RetransmissionTimer may be configured in the CG configuration that CG PUSCH-LBT Failure and/or CG PUSCH-retransmission correspond to.

The HARQ process ID for new transmission may have least one of the following characteristics (a)-(e).

(a) The HARQ process ID for new transmission does not correspond to a pending MAC PDU.

(b) The HARQ process ID for new transmission may not be identified as pending.

(c) The configuredGrantTimer of the HARQ process ID for new transmission may not be configured, or may be configured and is not running.

(d) The cg-RetransmissionTimer of the HARQ process ID for new transmission may not be configured, or may be configured and is not running.

(e) The HARQ process ID of new transmission may not correspond to a deprioritized CG PUSCH/MAC PDU.

The HARQ process ID for retransmission may have least one of the following characteristics (a)-(e).

(a) The HARQ process ID for retransmission may include a pending MAC PDU.

(b) The HARQ process ID for retransmission may be identified as pending.

(c) The configuredGrantTimer of the HARQ process ID for retransmission may not be configured, or may be configured and is running.

(d) The cg-RetransmissionTimer of the HARQ process ID for retransmission may not be configured, or may be configured and is not running.

(e) DFI indicating ACK may not have been received for the HARQ process ID for retransmission.

The LCH-based prioritization is described as follows.

For the MAC entity configured with lch-basedPrioritization, priority of an uplink grant is determined by the highest priority among priorities of the logical channels that are multiplexed (i.e. the MAC PDU to transmit is already stored in the HARQ buffer) or have data available that may be multiplexed (i.e. the MAC PDU to transmit is not stored in the HARQ buffer) in the MAC PDU, according to the mapping restrictions as described in clause 5.4.3.1.2 of 3GPP TS 38.321. The priority of an uplink grant for which no data for logical channels is multiplexed or may be multiplexed in the MAC PDU is lower than either the priority of an uplink grant for which data for any logical channels is multiplexed or may be multiplexed in the MAC PDU or the priority of the logical channel triggering an SR.

For the MAC entity configured with lch-basedPrioritization, if the corresponding PUSCH transmission of a configured uplink grant is cancelled by CI-RNTI as specified in clause 11.2A of 3GPP TS 38.213, or cancelled by a high PHY-priority PUCCH transmission as specified in clause 9 of 3GPP TS 38.213, this configured uplink grant is considered to be a de-prioritized uplink grant. If this deprioritized uplink grant is configured with autonomousTx, the configuredGrantTimer for the corresponding HARQ process of this de-prioritized uplink grant may be stopped if it is running.

Table 1 below shows an example of MAC entity behavior when the MAC entity is configured with lch-basedPrioritization for each uplink grant whose associated PUSCH may be transmitted by lower layers.

TABLE 1

When the MAC entity is configured with lch-basedPrioritization, for each uplink grant whose associated PUSCH may be transmitted by lower layers, the MAC entity may:
1>     if the uplink grant is addressed to CS-RNTI with NDI = 1 or C-RNTI:
  2> if there is no overlapping PUSCH duration of a configured uplink grant which was not already de-prioritized, in the same BWP whose priority is higher than the priority of the uplink grant; and
  2> if there is no overlapping PUCCH resource with an SR transmission which was not already de-prioritized and the priority of the logical channel that triggered the SR is higher than the priority of the uplink grant:
    3>     consider the uplink grant as a prioritized uplink grant;
    3>     consider the other overlapping uplink grant(s), if any, as a de-prioritized uplink grant(s);
    3>     consider the other overlapping SR transmission(s), if any, as a de-prioritized SR transmission(s).
1>     else if the uplink grant is a configured uplink grant:
  2> if there is no overlapping PUSCH duration of another configured uplink grant which was not already de-prioritized, in the same BWP, whose priority is higher than the priority of the uplink grant; and
  2> if there is no overlapping PUSCH duration of an uplink grant addressed to CS-RNTI with NDI = 1 or C-RNTI which was not already de-prioritized, in the same BWP, whose priority is higher than or equal to the priority of the uplink grant; and
  2> if there is no overlapping PUCCH resource with an SR transmission which was not already de-prioritized and the priority of the logical channel that triggered the SR is higher than the priority of the uplink grant:
    3>     consider the uplink grant as a prioritized uplink grant;
    3>     consider the other overlapping uplink grant(s), if any, as a de-prioritized uplink grant(s);
    3>     if the de-prioritized uplink grant(s) is a configured uplink grant configured with autonomousTx whose PUSCH has already started:
        4> stop the configuredGrantTimer for the corresponding HARQ process of the de-prioritized uplink grant(s).
    3>     consider the other overlapping SR transmission(s), if any, as a de-prioritized SR transmission(s).

If the MAC entity is configured with lch-basedPrioritization and if there is an overlapping PUSCH duration of at least two configured uplink grants whose priorities are equal, the prioritized uplink grant is determined by a UE-specific implementation. If the MAC entity is not configured with lch-basedPrioritzation and if there is an overlapping PUSCH duration of at least two configured uplink grants, it is up to the UE-specific implementation to choose one of the configured uplink grants.

Table 2 below shows an example of MAC entity behavior.

TABLE 2

For each Serving Cell and each configured uplink grant, if configured and activated, the MAC entity may:
1>    if the MAC entity is configured with lch-basedPrioritization, and the PUSCH duration of the configured uplink grant does not overlap with the PUSCH duration of an uplink grant received in a Random Access Response or with the PUSCH duration of an uplink grant addressed to Temporary C-RNTI or the PUSCH duration of a MSGA payload for this Serving Cell; or
1>    if the MAC entity is not configured with lch-basedPrioritization, and the PUSCH duration of the configured uplink grant does not overlap with the PUSCH duration of an uplink grant received on the PDCCH or in a Random Access Response or the PUSCH duration of a MSGA payload for this Serving Cell:
  2>  set the HARQ process ID to the HARQ process ID associated with this PUSCH duration;
  2>  if, for the corresponding HARQ process, the configuredGrantTimer is not running and cg-RetransmissionTimer is not configured (i.e. new transmission):
    3>  consider the NDI bit for the corresponding HARQ process to have been toggled;
    3>  deliver the configured uplink grant and the associated HARQ information to the HARQ entity.
  2>  else if the cg-RetransmissionTimer for the corresponding HARQ process is configured and not running, then for the corresponding HARQ process:
    3>  if the configuredGrantTimer is not running, and the HARQ process is not pending (i.e. new transmission):
      4>  consider the NDI bit to have been toggled;
      4>  deliver the configured uplink grant and the associated HARQ information to the HARQ entity.
    3>  else if the previous uplink grant delivered to the HARQ entity for the same HARQ process was a configured uplink grant (i.e. retransmission on configured grant):
      4>  deliver the configured uplink grant and the associated HARQ information to the HARQ entity.

Table 3 below shows an example of HARQ entity behavior.

TABLE 3

For each uplink grant, the HARQ entity may:
1>  identify the HARQ process associated with the grant, and for each identified HARQ process:
  2>  if the received grant was not addressed to a Temporary C-RNTI on a PDCCH, and the NDI provided in the associated HARQ information has been toggled compared to the value in the previous transmission of this TB of the HARQ process; or
  2>  if the uplink grant was received on a PDCCH for the C-RNTI and the HARQ buffer of the identified process is empty; or
  2>  if the uplink grant was received in a Random Access Response (i.e. in a MAC RAR or a fallback RAR); or
  2>  if the uplink grant was determined as specified in clause 5.1.2a for the transmission of the MSGA payload; or
  2>  if the uplink grant was received on PDCCH for the C-RNTI in ra-Response Window and the PDCCH successfully completed the Random Access procedure initiated for beam failure recovery; or
  2>  if the uplink grant is part of a bundle of the configured uplink grant, and may be used for initial transmission according to clause 6.1.2.3 of 3GPP TS 38.214, and if no MAC PDU has been obtained for this bundle:
    3>  if there is a MAC PDU in the MSGA buffer and the uplink grant determined as specified in clause 5.1.2a for the transmission of the MSGA payload was selected; or
    3>  if there is a MAC PDU in the MSGA buffer and the uplink grant was received in a fallbackRAR and the fallbackRAR successfully completed the Random Access procedure:
      4>  obtain the MAC PDU to transmit from the MSGA buffer.
    3>  else if there is a MAC PDU in the Msg3 buffer and the uplink grant was received in a fallbackRAR:
      4>obtain the MAC PDU to transmit from the Msg3 buffer.
    3>  else if there is a MAC PDU in the Msg3 buffer and the uplink grant was received in a MAC RAR; or:
    3>  if there is a MAC PDU in the Msg3 buffer and the uplink grant was received on a PDCCH for the C-RNTI in ra-ResponseWindow and the PDCCH successfully completed the Random Access procedure initiated for beam failure recovery:
      4>  obtain the MAC PDU to transmit from the Msg3 buffer.
      4>  if the uplink grant size does not match the size of the obtained MAC PDU; and
      4>  if the Random Access procedure was successfully completed upon receiving the uplink grant:
        5>  indicate to the Multiplexing and assembly entity to include MAC subPDU(s) carrying MAC SDU from the obtained MAC PDU in the subsequent uplink transmission;
        5>  obtain the MAC PDU to transmit from the Multiplexing and assembly entity.

TABLE 3-continued

3>     else if the uplink grant is a configured grant configured with autonomousTx; and
3>     if the previous configured uplink grant, in the BWP, for this HARQ process was not prioritized; and
3>     if a MAC PDU had already been obtained for this HARQ process; and
3>     if the uplink grant size matches the size of the obtained MAC PDU; and
3>     if none of PUSCH transmission(s) of the obtained MAC PDU has been completely performed:
        4> consider the MAC PDU has been obtained.
3>     else if the MAC entity is not configured with lch-basedPrioritization; or
3>     if this uplink grant is a prioritized uplink grant:
        4> obtain the MAC PDU to transmit from the Multiplexing and assembly entity, if any;
3>     if a MAC PDU to transmit has been obtained:
        4> if the uplink grant is not a configured grant configured with autonomousTx; or
        4> if the uplink grant is a prioritized uplink grant:
            5> deliver the MAC PDU and the uplink grant and the HARQ information of the TB to the identified HARQ process;
            5> instruct the identified HARQ process to trigger a new transmission;
            5> if the uplink grant is a configured uplink grant:
                6> start or restart the configuredGrantTimer, if configured, for the corresponding HARQ process when the transmission is performed if an LBT failure indication is not received from lower layers;
                6> start or restart the cg-RetransmissionTimer, if configured, for the corresponding HARQ process when the transmission is performed if an LBT failure indication is not received from lower layers.
            5> if the uplink grant is addressed to C-RNTI, and the identified HARQ process is configured for a configured uplink grant:
                6> start or restart the configuredGrantTimer, if configured, for the corresponding HARQ process when the transmission is performed if an LBT failure indication is not received from lower layers.
            5> if cg-RetransmissionTimer is configured for the identified HARQ process; and
            5> if the transmission is performed and an UBT failure indication is received from lower layers:
                6> consider the identified HARQ process as pending.
3>     else:
        4> flush the HARQ buffer of the identified HARQ process.
2> else (i.e. retransmission):
3>     if the uplink grant received on a PDCCH was addressed to CS-RNTI and if the HARQ buffer of the identified process is empty; or
3>     if the uplink grant is part of a bundle and if no MAC PDU has been obtained for this bundle; or
3>     if the uplink grant is part of a bundle of the configured uplink grant, and the PUSCH duration of the uplink grant overlaps a PUSCH duration of another uplink grant received on the PDCCH or an uplink grant received in a Random Access Response (i.e. MAC RAR or fallbackRAR) or an uplink grant determined as specified in clause 5.1.2a for MSGA payload for this Serving Cell; or:
3>     if the MAC entity is configured with lch-basedPrioritization and the uplink grant is not a prioritized uplink grant:
        4> ignore the uplink grant.
3>     else:
        4> deliver the uplink grant and the HARQ information (redundancy version) of the TB to the identified HARQ process;
        4> instruct the identified HARQ process to trigger a retransmission;
        4> if the uplink grant is addressed to CS-RNTI; or
        4> if the uplink grant is addressed to C-RNTI, and the identified HARQ process is configured for a configured uplink grant:
            5> start or restart the configuredGrantTimer, if configured, for the corresponding HARQ process when the transmission is performed if an LBT failure indication is not received from lower layers.
        4> if the uplink grant is a configured uplink grant:
            5> if the identified HARQ process is pending:
                6> start or restart the configuredGrantTimer, if configured, for the corresponding HARQ process when the transmission is performed if an LBT failure indication is not received from lower layers;
            5> start or restart the cg-RetransmissionTimer, if configured, for the corresponding HARQ process when the transmission is performed if an LBT failure indication is not received from lower layers.
        4> if the identified HARQ process is pending and the transmission is performed and an LBT failure indication is not received from lower layers:
            5> consider the identified HARQ process as not pending.

When determining whether the NDI has been toggled compared to the value in the previous transmission the MAC entity may ignore the NDI received in all uplink grants on a PDCCH for its Temporary C-RNTI. When configuredGrantTimer or cg-RetransmissionTimer is started or restarted by a PUSCH transmission, it may be started at the beginning of the first symbol of the PUSCH transmission.

NR-based Access to Unlicensed Spectrum has been agreed to by 3GPP as one of the WIs for NR Rel-16. This WI specifies NR enhancements for a single global solution framework for access to unlicensed spectrum which enables operation of NR in the 5 GHz and the 6 GHz unlicensed bands, taking into account regional regulatory requirements. The NR-U design should enable fair coexistence between already deployed Wi-Fi generations and NR-U, between NR-U and LTE-LAA, between different NR-U systems, etc.

In an unlicensed spectrum, a UE may be required to perform channel access (e.g., LBT/CCA) before performing a transmission in order to make sure there is no other device occupying the channel where the transmission is intended to be performed. For a channel access mechanism in NR-U, an LTE-LAA LBT mechanism may be adopted as baseline for the 5 GHz band and adopted as the starting point of the design for the 6 GHz band. At least for band where absence of Wi-Fi may not be guaranteed (e.g., by regulation), LBT may be performed in units of 20 MHz. In general, there are 4 LBT categories. For NR-U, a UE may perform LBT using one of the 4 LBT categories before performing a UL transmission for different transmissions in a COT (as defined below) and different channels/signals to be transmitted. Specifically, a UE may perform LBT using different LBT categories before performing a UL transmission (e.g., PRACH, PUCCH, PUSCH, SRS transmission, etc.). LBT Categories 1-4 are provided as follows.

Category 1: Immediate transmission after a short switching gap. This may be used for a transmitter to immediately transmit after a switching gap inside a COT. More specifically, the switching gap from reception to transmission is to accommodate the transceiver turnaround time and is no longer than 16 μs. Category 1 may also be known as a Type 2 UL channel access procedure.

Category 2: LBT without random back-off. The duration of time that the channel (where transmission is intended to be performed) is sensed to be idle before the transmitting entity transmits is deterministic. Category 2 may also be known as a Type 2 UL channel access procedure.

Category 3: LBT with random back-off with a contention window of fixed size. This LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel (where transmission is intended to be performed) is sensed to be idle before the transmitting entity transmits on the channel.

Category 4: LBT with random back-off with a contention window of variable size. This LBT procedure has the following as one of its components. The transmitting entity draws a random number N within a contention window. The size of the contention window is specified by the minimum and maximum value of N. The transmitting entity may vary the size of the contention window when drawing the random number N. The random number N is used in the LBT procedure to determine the duration of time that the channel (where transmission is intended to be performed) is sensed to be idle before the transmitting entity transmits on the channel. Category 4 may also be known as a Type 1 UL channel access procedure.

The transmission may be performed by a UE only if the LBT is successful (e.g., explained under each LBT category as shown above). The maximum continuous transmission time (upon successful LBT) may be predetermined by a COT value. LBT may be considered successful if the channel is sensed to be idle (e.g., the power detected by a UE, which intends to perform a UL transmission, is less than a predetermined/configured power threshold) for a predetermined/configured duration of time during an LBT procedure (if LBT Category 2/3/4 is performed). On the other hand, LBT may be considered successful if the UE performs LBT Category 1. Otherwise, LBT failure may be considered not successful. When LBT failure is considered not successful for a UL transmission, the MAC entity may receive an LBT failure indication from PHY.

LCH-based prioritization is introduced in NR Rel-16. An IE (e.g., lch-BasedPrioritization IE) may be configured for a UE (on a per MAC entity basis). If lch-BasedPrioritization IE is configured (e.g., at a MAC entity), the (MAC entity of the) UE may perform LCH-based prioritization. LCH-based prioritization may also be referred to as one type of intra-UE prioritization. If a (MAC entity of a) UE is configured with lch-BasedPrioritization, the (MAC entity of the) UE may perform LCH-based prioritization when two or more UL resources (fully/partially) overlap in the time domain (in the same BWP/cell). A UL resource from the two or more UL resources may be a PUSCH resource or a PUCCH resource for SR transmission. If two or more UL resources (fully/partially) overlap in the time domain (in the same BWP/cell), the UE may determine a prioritized UL resource from the two or more overlapping UL resources with the highest priority, and the other overlapping UL resource(s) that is not determined as a prioritized UL resource may be referred to as a deprioritized UL resource(s). Subsequently, UL transmission may be performed on the prioritized UL resource, and may not be performed on the deprioritized UL resource.

The priority of an uplink resource may be determined by the following rules (a) and (b).

(a) Priority of a PUSCH resource. If the UL resource is a PUSCH resource, the priority of the UL resource may be the highest priority among priorities of the LCHs that are multiplexed (i.e., the MAC PDU to transmit is already stored in the HARQ buffer) or have data available that may be multiplexed (i.e., the MAC PDU to transmit is not stored in the HARQ buffer) in the MAC PDU, according to the LCP mapping restrictions as described in clause 5.4.3.1.2 of 3GPP TS 38.321, for transmission on the UL resource.

The priority of a first UL resource, for which no data for LCHs is multiplexed or may be multiplexed in the MAC PDU for transmission on the first UL resource, is lower than the priority of a second UL resource if data for any LCHs is multiplexed or may be multiplexed in the MAC PDU for transmission on the second UL resource.

The priority of a UL resource, for which no data for LCHs is multiplexed or may be multiplexed in the MAC PDU for transmission on the UL resource, is lower than the priority of the LCH triggering an SR.

If the MAC entity is configured with lch-basedPrioritization and if there are at least two time-domain overlapping CG PUSCHs whose priorities are equal, the prioritized CG PUSCH may be determined by UE-specific implementation.

If the MAC entity is configured with lch-basedPrioritization and if a first PUSCH resource scheduled by a dynamic grant overlaps a second CG PUSCH in the time-domain, the priority of first PUSCH resource may be considered as the prioritized PUSCH resource if the priorities of the first and second PUSCH resources are the same.

In the present disclosure, the term "priority" may be referred to as "LCH priority". An LCH priority (e.g., priority IE) associated with an LCH may be configured in the IE that configures the LCH (e.g., LogicalChannelConfig IE). Moreover, an increasing LCH priority value may indicate a lower priority. For example, a first LCH associated with an LCH priority value of 1 may have higher priority than a second LCH associated with an LCH priority value of 2.

(b) Priority of an SR. If the UL resource is a PUCCH resource for SR transmission, the priority of the UL resource may be the priority of the LCH that triggers the SR.

A Frame based equipment (FBE) is an equipment that may operate in an unlicensed environment. The transmit/receive structure of an FBE has a periodic timing with a periodicity equal to a fixed frame period (FFP). Two types of devices are defined for FBE operation, where a device that initiates a sequence of one or more transmissions is defined as the initiating device. Otherwise, the device is defined as a responding device.

To initiate a sequence of one or more transmissions, an initiating device may perform a clear channel assessment (CCA) check during a single observation slot/idle period immediately before starting transmissions on an operating channel at the start of an FFP. If the operating channel is found to be clear, the initiating device may start the transmission immediately. Otherwise, there may be no transmissions on that channel during the next FFP.

An initiating device is allowed to grant an authorization to one or more associated responding devices to transmit on the current operating channel within the current COT. A responding device may proceed with transmissions without performing a CCA if it receives a grant and if these transmissions are initiated at most 16 µs after the last transmission by the initiating device that issued the grant.

A responding device may perform a CCA on the operating channel during a single observation slot within a 25 µs period ending immediately before the granted transmission time which is later than 16 µs after the last transmission by the initiating device that issued the grant.

In NR Rel-16 NR-U, gNB may operate as an initiating device. The gNB may provide the FFP configuration to a UE via SIB1 or dedicated RRC signaling (e.g., the UE is configured, by the network, channelAccessMode=Semi StaticChannelAccessConfig via SIB1 or dedicated RRC signaling). The FFP (e.g., defined by the period IE in the SemiStaticChannelAccessConfig IE) is restricted to values of {1 ms, 2 ms, 2.5 ms, 4 ms, 5 ms, 10 ms}. The starting positions of the FFPs within every two radio frames starts from an even radio frame and are given by i*P where i={0, 1, . . . , 20/P−1} where P is the fixed frame period in milliseconds. The observation slot/idle period for a given SCS=ceil (minimum observation slot/idle period allowed by regulations/Ts), where minimum observation slot/idle period allowed=max (5% of FFP, 100 us), and Ts is the symbol duration for the given SCS. UE transmissions within a fixed frame period may occur if DL signals/channels (e.g., PDCCH, SSB, PBCH, RMSI, GC-PDCCH, . . . ) within the fixed frame period are detected.

A PRACH resource is considered invalid if it overlaps the observation slot/idle period of an FFP when FBE operation is indicated.

With configured uplink grants, the network may allocate UL resources (e.g., PUSCH resources) for the initial HARQ transmissions to UEs via RRC configuration (and PDCCH). Two types of configured uplink grants are defined. With Type 1, RRC signaling directly provides the configured uplink grant (including the periodicity). The UL resource (e.g., PUSCH resource) that corresponds to a configured grant Type 1 configuration is configured directly by the network via RRC signaling. With Type 2, RRC defines the periodicity of the configured uplink grant while PDCCH addressed to CS-RNTI may either signal and activate the configured uplink grant, or deactivate it (e.g., a PDCCH addressed to CS-RNTI indicates that the uplink grant may be implicitly reused according to the periodicity defined by RRC, until deactivated).

Type 1 and Type 2 are configured by RRC signaling per serving cell and per BWP. Multiple configurations may be active simultaneously only on different serving cells. For Type 2, activation and deactivation are independent among the serving cells. For the same serving cell, the MAC entity is configured with either Type 1 or Type 2.

RRC signaling may configure the following parameters (a)-(e) when the configured grant Type 1 is configured:
 (a) cs-RNTI: CS-RNTI for retransmission.
 (b) periodicity: periodicity of the configured grant Type 1.
 (c) timeDomainOffset: Offset of a resource with respect to SFN=0 in the time domain.
 (d) timeDomainAllocation: Allocation of the configured uplink grant in the time domain which contains startSymbolAndLength (e.g., SLIV in 3GPP TS 38.214).
 (e) nrofHARQ-Processes: the number of HARQ processes for the configured grant.

Upon configuration of a configured grant Type 1 for a serving cell by upper layers, the MAC entity may (i) store the uplink grant provided by upper layers as a configured uplink grant for the indicated serving cell, and (ii) initialize or re-initialize the configured uplink grant to start in the symbol according to timeDomainOffset and S (derived from SLIV as specified in 3GPP TS 38.214), and to reoccur with periodicity.

FIG. 1 is a schematic diagram illustrating a configured grant timer operation in NR, according to an example implementation of the present disclosure.

In NR Rel-15, a timer configuredGrantTimer is introduced. The timer configuredGrantTimer may be maintained per HARQ process ID. Whenever a UE performs a specific (re-)transmission (e.g., on a resource indicated by an uplink grant addressed to C-RNTI and the identified HARQ process is configured for a configured uplink grant, on a PUSCH that corresponds to a configured uplink grant (e.g., the CG PUSCH 110), or on a resource indicated by an uplink grant addressed to the CS-RNTI), a configuredGrantTimer that corresponds to the HARQ process ID (e.g., HARQ process ID=1) of the (re-)transmission is (re)started (e.g., upon transmission on CG PUSCH 110). While configuredGrantTimer that corresponds to a HARQ process is running, the UE is prohibited from performing a new transmission (e.g., generate a new TB/MAC PDU for transmission) on a configured uplink grant (e.g., the CG PUSCH 120) of the HARQ process ID.

Several new features related to a configured uplink grant (e.g., Feature 1-1 to 1-5), as listed below, are introduced in NR Rel-16 NR-U WI to ensure the configured uplink grant mechanism may operate smoothly in an unlicensed environment (e.g., shared spectrum) where LBT failure may occur. In some implementations, a configured grant configuration may apply at least one of the features listed below only if cg-RetransmissionTimer is configured in the configured grant configuration (e.g., ConfiguredGrantConfig IE). The cg-RetransmissionTimer may always be configured in a configured grant configuration (e.g., ConfiguredGrantConfig IE) that operates in an unlicensed environment (e.g., shared spectrum). The cg-RetransmissionTimer may not be configured in a configured grant configuration (e.g., ConfiguredGrantConfig IE) that operates in a licensed environment (e.g., licensed spectrum).

Feature 1-1: HARQ process ID selection of a CG PUSCH based on a UE-specific implementation.

The selection of a HARQ process ID for a CG PUSCH may be based on a UE-specific implementation. A UE may select a HARQ process ID for a CG PUSCH among the HARQ process IDs available for the configured grant configuration. More specifically, the HARQ process IDs available for the configured grant configuration may be determined based on the value of two parameters, harq-procID-Offset and nrofHARQ-Processes, as configured for the configured grant configuration (e.g., ConfiguredGrantConfig IE).

If both harq-procID-Offset and nrofHARQ-Processes are configured for a configured grant configuration (e.g., ConfiguredGrantConfig IE), a UE may select a HARQ process ID for a CG PUSCH within [harq-procID-Offset, . . . , (harq-procID-Offset+nrofHARQ-Processes−1)].

If only nrofHARQ-Processes is configured for a configured grant configuration (e.g., ConfiguredGrantConfig IE), a UE may select a HARQ process ID for a CG PUSCH within [0, 1, . . . , (nrofHARQ-Processes−1)].

The harq-procID-Offset may always be configured together with cg-RetransmissionTimer in a configured grant configuration (e.g., ConfiguredGrantConfig IE) that operates in an unlicensed environment (e.g., shared spectrum).

A UE may prioritize retransmissions before initial transmissions when selecting a HARQ process ID for a CG PUSCH. When selecting a HARQ process ID of a CG PUSCH via a UE-specific implementation, CG Uplink Control Information (CG-UCI) may be used to indicate the HARQ process ID that is selected for the CG PUSCH. In some aspects of the present implementation, the CG-UCI may be multiplexed on the CG PUSCH. CG-UCI may include HARQ process ID, RV, NDI, and COT information of a CG PUSCH (that the CG-UCI multiplexes with). The UE may toggle the NDI in the CG-UCI for new transmissions and may not toggle the NDI in the CG-UCI in retransmissions.

Feature 1-2: RV selection of a CG PUSCH based on a UE-specific implementation.

A UE may select an RV of a CG PUSCH based on a UE-specific implementation. The CG PUSCH may be for initial transmission or for retransmission (e.g., repetition).

Figure 2:
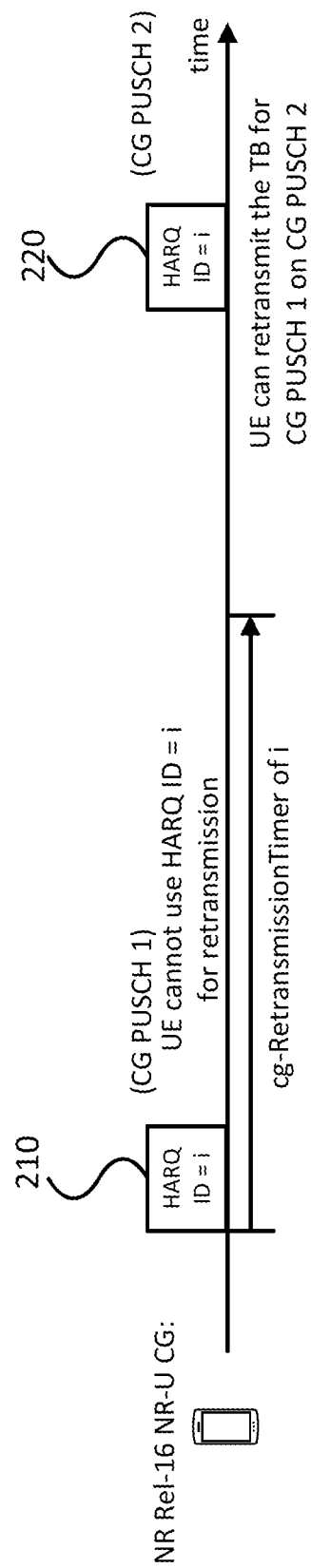
FIG. 2 is a schematic diagram illustrating an operation of the CG timer, according to an example implementation of the present disclosure.

Feature 1-3: Autonomous retransmission of a MAC PDU/TB on a CG PUSCH. FIG. 2 is a schematic diagram illustrating an operation of the CG timer (e.g., cg-RetransmissionTimer), according to an example implementation of the present disclosure.

When a UE fails to transmit a generated MAC PDU/TB on a first CG PUSCH (e.g., CG PUSCH 1 as represented by 210 in FIG. 2), the UE may perform autonomous retransmission on a second CG PUSCH (e.g., CG PUSCH 2 as represented by 220 in FIG. 2) if at least one of the following conditions (e.g., from Condition A1 through Condition A6) is satisfied. The UE may fail to transmit a MAC PDU/TB due to LBT failure (e.g., the UE senses the channel to be busy, the UE receives an LBT failure indication, etc.). The UE may consider the NDI bit as "not toggled" when it determines to perform autonomous retransmission on a second CG PUSCH (e.g., CG PUSCH 2 as represented by 220 in FIG. 2).

Condition A1: The TBS of the first CG PUSCH (e.g., CG PUSCH 1 as represented by 210 in FIG. 2) is the same as the TBS of the second CG PUSCH (e.g., CG PUSCH 2 as represented by 220 in FIG. 2).

Condition A2: The first CG PUSCH (e.g., CG PUSCH 1 as represented by 210 in FIG. 2) and the second CG PUSCH (e.g., CG PUSCH 2 as represented by 220 in FIG. 2) have the same HARQ process ID (e.g., HARQ process ID=i).

Condition A3: The configured grant configuration(s) that the first CG PUSCH (e.g., CG PUSCH 1 as represented by 210 in FIG. 2) and the second CG PUSCH (e.g., CG PUSCH 2 as represented by 220 in FIG. 2) correspond to are configured in the same BWP. The configured grant configuration(s) that corresponds to the first CG PUSCH (e.g., CG PUSCH 1 as represented by 210 in FIG. 2) and the second CG PUSCH (e.g., CG PUSCH 2 as represented by 220 in FIG. 2) may or may not be the same. However, they need to be configured in the same BWP.

Condition A4: The network has not provided a dynamic grant for retransmission of the first CG PUSCH (e.g., CG PUSCH 1 as represented by 210 in FIG. 2). The dynamic grant for retransmission of the first CG PUSCH (e.g., CG PUSCH 1 as represented by 210 in FIG. 2) may have the same HARQ process ID as the first CG PUSCH (e.g., CG PUSCH 1 as represented by 210 in FIG. 2). If the network has provided a dynamic grant (e.g., a UL grant associated with C-RNTI or CS-RNTI) for retransmission of the first CG PUSCH (e.g., CG PUSCH 1 as represented by 210 in FIG. 2) before the second CG PUSCH (e.g., CG PUSCH 2 as represented by 220 in FIG. 2) becomes available, the second CG PUSCH (e.g., CG PUSCH 2 as represented by 220 in FIG. 2) may not be used for autonomous retransmission.

Condition A5: The cg-RetransmissionTimer that corresponds to the HARQ process ID of the first (and second) PUSCH is not running. The cg-RetransmissionTimer may be configured per HARQ process ID. It may be used to prohibit a UE from performing immediate autonomous retransmission on a CG PUSCH. The UE may only perform retransmission on a CG PUSCH if the cg-RetransmissionTimer for the HARQ process of the CG PUSCH is not running.

The cg-RetransmissionTimer of a HARQ process may be (re)started when transmission (e.g., new transmission or retransmission) on a configured uplink grant of the HARQ process is performed successfully (e.g., the UE does not receive an LBT failure indication for the corresponding transmission). For example, in FIG. 2, the cg-RetransmissionTimer for a HARQ process (e.g., HARQ ID=i) of CG PUSCH 1 may be (re)started when transmission of a TB on CG PUSCH 1 is performed successfully. Subsequently, the UE may retransmit the TB for CG PUSCH 1 on CG PUSCH 2 when the cg-RetransmissionTimer for the HARQ process of CG PUSCH 1 is stopped or is not running. In some implementations, the cg-RetransmissionTimer of a HARQ process may be stopped when the UE receives DFI for the corresponding HARQ process. In some implementations, the cg-RetransmissionTimer of a HARQ process may be stopped when the UE receives a dynamic grant (e.g., a UL grant associated with C-RNTI or CS-RNTI) for the HARQ process. In some implementations, the cg-RetransmissionTimer of a HARQ process may be stopped when the configuredGrantTimer for the HARQ process expires. In some implementations, the cg-RetransmissionTimer of a HARQ process may be stopped when a configured grant Type 2 activation command is received for a configured grant configuration that the HARQ process corresponds to.

Condition A6: The second CG PUSCH (e.g., CG PUSCH 2 as represented by 220 in FIG. 2) is for retransmission.

The UE may only perform autonomous transmission on the second CG PUSCH only if the second CG PUSCH (e.g., CG PUSCH 2 as represented by 220 in FIG. 2) is for retransmission.

The second CG PUSCH (e.g., CG PUSCH 2 as represented by 220 in FIG. 2) may be considered for retransmission if the configuredGrantTimer for the HARQ process ID of the second CG PUSCH (e.g., CG PUSCH 2 as represented by 220 in FIG. 2) is running and the cg-RetransmissionTimer for the HARQ process of the second CG PUSCH (e.g., CG PUSCH 2 as represented by 220 in FIG. 2) is configured and not running.

The second CG PUSCH (e.g., CG PUSCH 2 as represented by 220 in FIG. 2) may be considered for retransmission if the configuredGrantTimer for the HARQ process ID of the second CG PUSCH (e.g., CG PUSCH 2 as represented by 220 in FIG. 2) is running, the cg-RetransmissionTimer for the HARQ process of the second CG PUSCH (e.g., CG PUSCH 2 as represented by 220 in FIG. 2) is configured and not running, and the HARQ process of the second CG PUSCH (e.g., CG PUSCH 2 as represented by 220 in FIG. 2) is pending/not pending.

The second CG PUSCH (e.g., CG PUSCH 2 as represented by 220 in FIG. 2) may be considered for retransmission if the configuredGrantTimer for the HARQ process ID of the second CG PUSCH (e.g., CG PUSCH 2 as represented by 220 in FIG. 2) is running/not running, the cg-RetransmissionTimer for the HARQ process of the second CG PUSCH (e.g., CG PUSCH 2 as represented by 220 in FIG. 2) is configured and not running, and the HARQ process of the second CG PUSCH (e.g., CG PUSCH 2 as represented by 220 in FIG. 2) is pending.

Feature 1-4: DFI transmission from the network

A UE may be expected to receive DFI from the network. DFI may be indicated via a DCI format 0_1 with CRC scrambled by CS-RNTI). When a UE receives a DCI format 0_1 with CRC scrambled by CS-RNTI, the UE may identify that the received DCI is DFI if the (1-bit) DFI flag in the DCI indicates a value of 1. The DFI flag in a DCI format 0_1 may be either 0-bit or 1-bit. The DFI flag is 1 bit if the UE is configured to monitor DCI format 0_1 with CRC scrambled by CS-RNTI and for operation in a cell with shared spectrum channel access.

DFI may include a (16-bit) HARQ-ACK bitmap, where the order of the bitmap to HARQ process index mapping is such that HARQ process indices are mapped in ascending order from MSB to LSB of the bitmap. For each bit of the bitmap, value 1 indicates ACK, and value 0 indicates NACK.

A cg-minDFI-Delay IE may be configured for a configured grant configuration (e.g., ConfiguredGrantConfig IE). When configured in a configured grant configuration (e.g., ConfiguredGrantConfig IE), the cg-minDFI-Delay IE may indicate the minimum duration (in unit of symbols) from the ending symbol of a CG PUSCH to the starting symbol of the PDCCH containing the DFI carrying HARQ-ACK for this CG PUSCH. The HARQ-ACK received before this minimum duration may not be considered as valid for this CG PUSCH.

The cg-RetransmissionTimer of a HARQ process may be stopped when the UE receives (valid) DFI for the corresponding HARQ process. The configuredGrantTimer of a HARQ process may be stopped when the UE receives (valid) DFI indicating ACK for the corresponding HARQ process.

Feature 1-5: UE behavior upon LBT failure.

If a CG PUSCH is not successfully transmitted due to LBT failure, the configuredGrantTimer that corresponds to the HARQ process ID of the CG PUSCH is not (re)started. If a CG PUSCH is not successfully transmitted due to LBT failure, the cg-RetransmissionTimer that corresponds to the HARQ process of the CG PUSCH is not (re)started.

A configuredGrantTimer that corresponds to a HARQ process ID is only (re)started if an LBT failure indication is not received from PHY when transmission is performed (e.g., successful transmission) for the HARQ process. A cg-RetransmissionTimer that corresponds to a HARQ process ID is only (re)started if an LBT failure indication is not received from PHY when transmission is performed (e.g., successful transmission) for the HARQ process.

A device that supports NR Rel-16 IIoT/URLLC features may be operated under a licensed spectrum (e.g., a licensed carrier/cell). Several new features related to configured uplink grant (e.g., Features 2-1 to 2-4), as listed below, are introduced in NR Rel-16 IIoT/URLLC WI to ensure the configured uplink grant mechanism may meet the reliability and delay requirement of IIoT/URLLC traffic. A configured grant configuration may apply at least one of the features listed below only if cg-RetransmissionTimer is not configured in the configured grant configuration (e.g., ConfiguredGrantConfig IE). The cg-RetransmissionTimer may not be configured in a configured grant configuration (e.g., ConfiguredGrantConfig IE) that operates in a licensed environment (e.g., licensed spectrum).

Feature 2-1: HARQ process ID selection of a CG PUSCH based on a predefined equation.

For a configured grant configuration that is neither configured with harq-ProcID-Offset2 nor with cg-RetransmissionTimer (e.g., neither harq-ProcID-Offset2 nor with cg-RetransmissionTimer is configured in ConfiguredGrantConfig IE of the configured grant configuration), the HARQ process ID associated with the first symbol of a CG PUSCH may be derived from Predefined Equation 1.

HARQ process ID=[floor(CURRENT_symbol/periodicity)]modulo nrofHARQ-Processes    Predefined Equation 1:

For a configured grant configuration that is configured with harq-ProcID-Offset2 (e.g., harq-ProcID-Offset2 is configured in ConfiguredGrantConfig IE of the configured grant configuration), the HARQ process ID associated with the first symbol of a CG PUSCH may be derived from Predefined Equation 2.

HARQ process ID=[floor(CURRENT_symbol/periodicity)]modulo nrofHARQ-Processes+harq-ProcID-Offset2    Predefined Equation 2:

More specifically, CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot, respectively, as specified in 3GPP TS 38.211. If cg-RetransmissionTimer is not configured, a HARQ process is not shared between different configured grant configurations in the same BWP. The harq-ProcID-Offset2 may not be configured simultaneously with cg-RetransmissionTimer in the same configured grant configuration (e.g., ConfiguredGrantConfig IE).

Feature 2-2: RV selection of a CG PUSCH based on configuration.

The RV of a CG PUSCH may be selected based on repk-RV configured in the configured grant configuration (e.g., configuredGrantConfig IE) that the CG-PUSCH corresponds to. The parameter repK-RV defines the redundancy version pattern to be applied to the repetitions. If neither repK-RV nor cg-RetransmissionTimer is provided in a configured grant configuration (e.g., configuredGrantConfig IE), the RV for CG PUSCH corresponding to the configured grant configuration may be set to 0. The parameter repK-RV and cg-RetransmissionTimer may not be configured in the same configured grant configuration (e.g., configuredGrantConfig IE).

Feature 2-3: Autonomous transmission of a MAC PDU/TB on a CG PUSCH.

When a UE fails to transmit a generated MAC PDU/TB on a first CG PUSCH, the UE may perform autonomous transmission on a second CG PUSCH if (at least one of) the following conditions (e.g., from Condition B1 through Condition B6) are satisfied. Specifically, the UE may fail to transmit a MAC PDU/TB due to the first PUSCH being deprioritized (e.g., the first CG PUSCH is considered as a deprioritized CG PUSCH) as a result of intra-UE prioritization (e.g., LCH-based prioritization).

Condition B1: The TBS of the first CG PUSCH is the same as the TBS of the second CG PUSCH.

Condition B2: The first CG PUSCH and the second CG PUSCH correspond to the same configured grant configuration in the same BWP.

Condition B3: The first CG PUSCH and the second CG PUSCH have the same HARQ process ID.

The second CG PUSCH, which has the same HARQ process ID as the first CG PUSCH, may be the CG PUSCH that becomes available first (e.g., that a UE receives first) after the first CG PUSCH.

Condition B4: The network has not provided a dynamic grant for retransmission of the first CG PUSCH.

The dynamic grant for retransmission of the first CG PUSCH may have the same HARQ process ID as the first CG PUSCH. If the network has provided a dynamic grant (e.g., a UL grant associated with C-RNTI or CS-RNTI) for retransmission of the first CG PUSCH before the second CG PUSCH becomes available, the second CG PUSCH may not be used for autonomous retransmission.

Condition B5: autonomousTx has been configured in the configured grant configuration (e.g., configuredGrantConfig IE) that the second CG PUSCH (and the first CG PUSCH) corresponds to.

The UE may perform autonomous transmission on the second CG PUSCH only if autonomousTx is configured for the configured grant configuration that the second CG PUSCH corresponds to. Moreover, the second CG PUSCH may be used for performing a new transmission. For example, the UE may perform autonomous transmission on the second CG PUSCH only if the configuredGrantTimer associated with the HARQ process ID of the second CG PUSCH is not running.

Condition B6: The second CG PUSCH is for new transmission (e.g., initial transmission).

The UE may perform autonomous transmission on the second CG PUSCH only if the second CG PUSCH is for new transmission. The second CG PUSCH may be considered for new transmission (e.g., initial transmission) if the configuredGrantTimer for the HARQ process ID of the second CG PUSCH is not running and the cg-RetransmissionTimer for the HARQ process of the second CG PUSCH is not configured. The second CG PUSCH may be considered for new transmission (e.g., initial transmission) if the configuredGrantTimer for the HARQ process ID of the second CG PUSCH is not running, the cg-RetransmissionTimer for the HARQ process of the second CG PUSCH is configured and not running, and the HARQ process ID of the second CG PUSCH is not considered as pending.

Feature 2-4: UE behavior when a MAC PDU/TB is deprioritized.

If a CG PUSCH is not successfully transmitted due the CG PUSCH being deprioritized, the configuredGrantTimer that corresponds to the HARQ process ID of the CG PUSCH is not (re)started.

Note that a UCE may be referred to as an unlicensed environment with controlled deployment. Therefore, interference from other systems using different radio access technology is not expected or only sporadically happens. An example of a UCE may be a factory with equipment (e.g., robots, actuators, sensors, etc.) that operates in an unlicensed band/carrier. Moreover, the equipment may be deployed in a specific manner such that they do not cause interference with one another. However, even with proper deployment, channel access (e.g., LBT/CCA) may still be required by an equipment (e.g., UE, gNB, etc.) before performing a transmission. This implies that LBT failure may still occur in a UCE.

To support URLLC/IIoT services over a UCE in NR Rel-17, some configuration restrictions have been lifted, given the fact that the channel condition in a UCE is relatively stable than in other unlicensed environments. Some new configuration features (e.g., Feature 3-1 to Feature 3-3) may be introduced below.

Feature 3-1: cg-RetransmissionTimer may be configured optionally for shared spectrum.

For instance, in NR Rel-16, cg-RetransmissionTimer IE always needs to be configured for shared spectrum. However, in NR Rel-17, cg-RetransmissionTimer IE may be configured optionally for shared spectrum. Moreover, when cg-RetransmissionTimer IE is not configured (in an FBE that operates in shared spectrum), the NR Rel-16 URLLC/IIoT mechanism may be used for HARQ process ID and RV selection. That is to say, when cg-RetransmissionTimer IE is not configured, the UE may derive a HARQ process ID of a CG PUSCH based on a predefined equation (e.g., Predefined Equation 1 or Predefined Equation 2). Moreover, when cg-RetransmissionTimer IE is not configured, the UE may derive an RV of a CG PUSCH based on a configuration (defined in Feature 2-2).

On the contrary, when cg-RetransmissionTimer IE is configured (in an FBE that operates in shared spectrum), the NR Rel-16 NR-U mechanism may be used for HARQ process ID and RV selection. That is to say, when cg-RetransmissionTimer IE is configured, the UE may derive a HARQ process ID and RV of a CG PUSCH based on a UE-specific implementation.

Feature 3-2: cg-RetransmissionTimer IE may be configured together with autonomousTx IE.

The assumption in NR Rel-16 is the network does not configure autonomousTx and cg-RetransmissionTimer simultaneously per cell. However, such a restriction may be lifted in NR Rel-17. Moreover, if both autonomousTx and cg-RetransmissionTimer are configured (in a serving cell), autonomousTx and cg-Retransmission may be used to handle deprioritized MAC PDU and LBT-failed MAC PDU, respectively. In other words, if a MAC PDU was not transmitted on a CG PUSCH due to the CG PUSCH being deprioritized (as a result of intra-UE prioritization), the MAC PDU may be transmitted on another CG resource (for new transmission) only if autonomousTx is configured. On the other hand, if a MAC PDU that was not transmitted on a CG PUSCH due to LBT failure, the MAC PDU may be retransmitted on another CG PUSCH (for retransmission) only if cg-RetransmissionTimer is configured.

Feature 3-3: cg-RetransmissionTimer IE may be configured together with lch-BasedPrioritization IE.

The cg-RetransmissionTimer IE may be configured together with lch-BasedPrioritization IE in the same serving cell to support IIoT/URLLC in a UCE in NR Rel-17.

One of the core objectives of NR Rel-17 WI on enhanced Industrial Internet of Things (IoT) and URLLC support is to ensure Rel-16 feature compatibility with unlicensed band URLLC/IIoT operation in controlled environments. Particularly, UL enhancements for IIoT/URLLC in UCEs may be studied. This includes harmonizing UL configured grant enhancements in NR-U and IIoT/URLLC introduced in Rel-16 to be applicable for unlicensed spectrum.

Note that a UCE may be referred to as an unlicensed environment with controlled deployment. Therefore, interference from other systems using different radio access technology is not expected or only sporadically happens. An example of a UCE may be a factory with equipment (e.g., robots, actuators, sensors, etc.) that operates in an unlicensed band/carrier. Moreover, the equipment may be deployed in a specific manner such that they do not cause interference with one another. However, even with proper deployment, channel access (e.g., LBT/CCA) may still be required by an equipment (e.g., UE, gNB, etc.) before performing a transmission. This implies that LBT failure may still occur in a UCE.

Based on the objective of NR Rel-17 WI of enhanced Industrial Internet of Things (eIIoT) and URLLC support, a new mechanism may be required to harmonize mechanisms/schemes introduced in Rel-16 NR-U WI and Rel-16 IIoT/URLLC WI. Hence, some configuration restrictions have been lifted, and some new configuration combinations (e.g., new IE combinations) have been allowed in order to support such harmonization. The present disclosure discusses the potential issues associated with the new configuration combinations (e.g., new IE combinations). Relevant solutions are also presented to resolve the identified issues.

Figure 3:
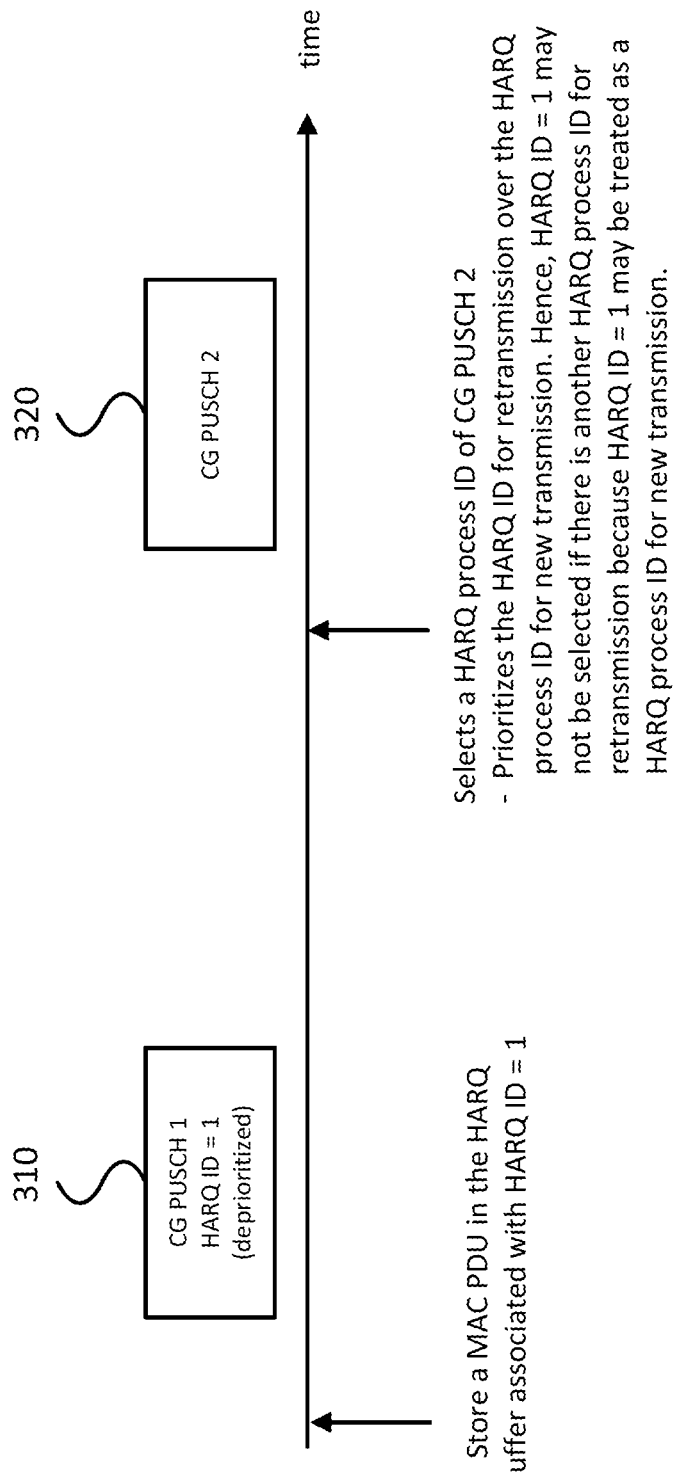
FIG. 3 is a schematic diagram illustrating an issue associated with the autonomous transmission of a deprioritized MAC PDU, according to an example implementation of the present disclosure.

FIG. 3 is a schematic diagram illustrating an issue associated with the autonomous transmission of a deprioritized MAC PDU, according to an example implementation of the present disclosure.

In NR Rel-17, autonomousTx, cg-RetransmssionTimer and lch-BasedPrioritization may be configured in the same serving cell/CG configuration/MAC entity. Intra-UE prioritization may occur (e.g., PHY-based prioritization and/or LCH-based prioritization) when two or more UL resources overlap in the time domain and/or when a UL resource is preempted by CI-RNTI. As a result of intra-UE prioritization, the UE may determine one prioritized UL resource out of the time-domain overlapping UL resources for transmission. Moreover, the UE may determine the UL resource(s) that overlaps the prioritized UL resource as a deprioritized UL resource(s). In the case that a deprioritized UL resource is a CG PUSCH, e.g., CG PUSCH 1 (as represented by 310) in FIG. 3, from a CG configuration configured with autonomousTx, the intended behavior may be to autonomously transmit a first MAC PDU, which was generated but was unable to be transmitted on CG PUSCH 1, on the next available CG PUSCH, e.g., CG PUSCH 2 (as represented by 320) in FIG. 3, with the same HARQ process ID. However, if cg-RetransmssionTimer is configured at the CG configuration that CG PUSCH 2 corresponds to, it may be up to a UE-specific implementation to select a HARQ process ID among the HARQ process IDs available for the configured grant configuration that CG PUSCH 2 corresponds to. Moreover, the UE may prioritize the HARQ process ID(s) for retransmission(s) over HARQ process ID(s) for new/initial transmission(s) when selecting a HARQ process ID of CG PUSCH 2. This behavior may delay the transmission of the first MAC PDU because the HARQ process ID of the first MAC PDU may be considered as a HARQ process ID for new transmission, i.e., the configuredGrantTimer and cg-RetransmissionTimer for the HARQ process ID of the first MAC PDU may not be running and/or the HARQ process ID of the first MAC PDU may not be considered as pending when CG PUSCH 2 becomes available. As a result, HARQ process ID of the first MAC PDU may be deprioritized when there is at least one HARQ process ID for retransmission from the CG configuration that CG PUSCH 2 corresponds to.

The HARQ process ID of the first MAC PDU may also be referred to as the HARQ process ID of CG PUSCH 1. CG PUSCH 1 and CG PUSCH 2 may have the same HARQ process ID and/or TBS. CG PUSCH 1 and CG PUSCH 2 may correspond to the same/different CG configuration. If lch-BasedPrioritization is configured at a UE, LCH-based prioritization may be performed by the UE when CG PUSCH 1 overlaps another UL resource (e.g., PUSCH, PUCCH, etc.) in the time domain (in the same serving cell). This may result in CG PUSCH 1 being deprioritized.

To not delay the autonomous transmission of a deprioritized MAC PDU, the UE may conditionally prioritize a HARQ process ID(s) for new transmission over HARQ process ID(s) for retransmission. Several solutions are proposed in the present disclosure.

Figure 4:
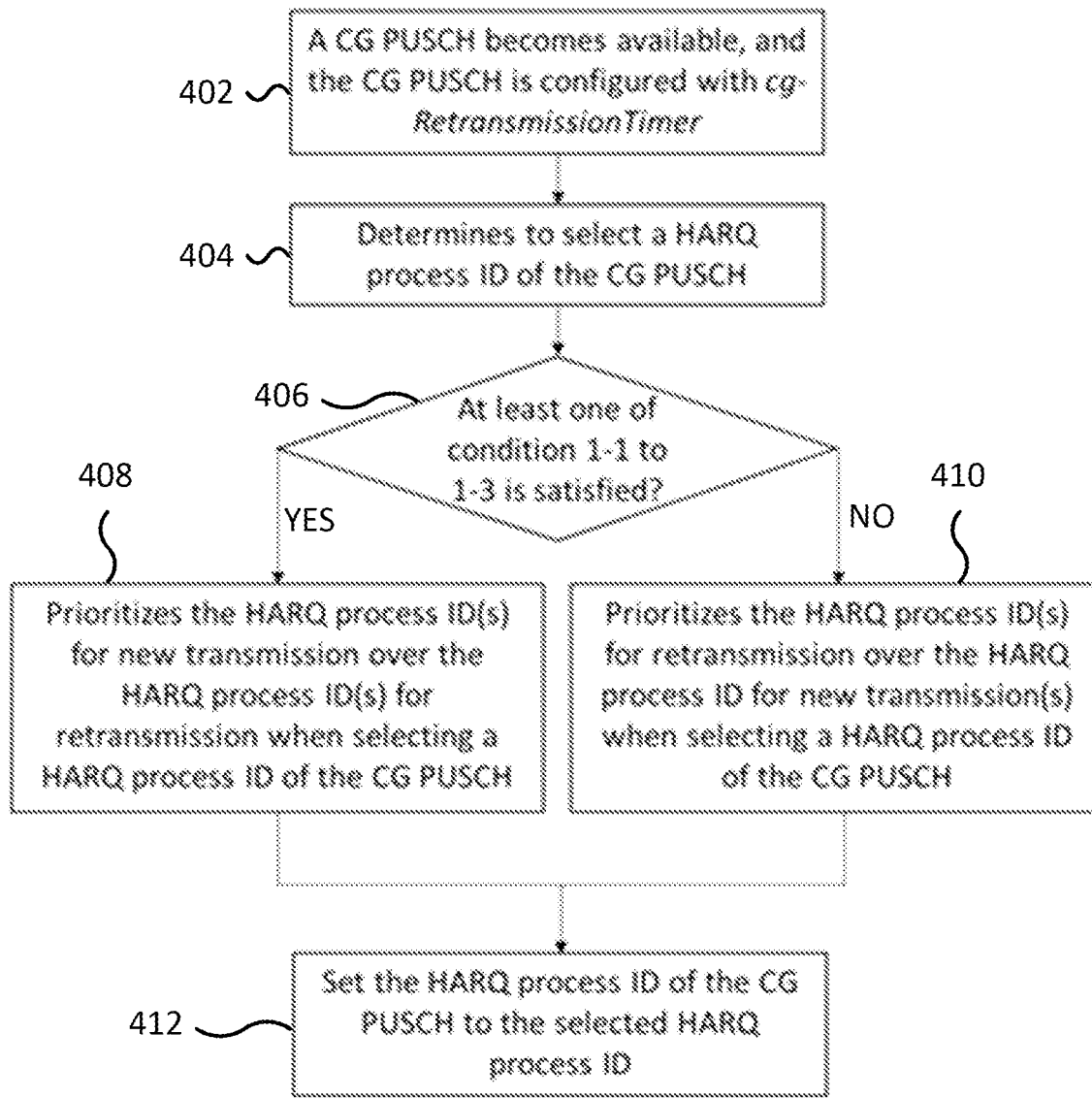
FIG. 4 is a flowchart illustrating a method for selecting HARQ process ID of a CG PUSCH, according to an example implementation of the present disclosure.

In some implementations, when a UE needs to select a HARQ process ID of a CG PUSCH, the UE may prioritize the HARQ process ID for new transmission (e.g., initial transmission) over the HARQ process ID for retransmission when at least one of the following conditions is satisfied. In some implementations, the UE may enable a first HARQ process ID selection procedure to select a HARQ process ID of a CG PUSCH, when at least one of the following conditions is satisfied (e.g., when Condition 1-2 described below is satisfied). In contrast, the UE may enable a second HARQ process ID selection procedure to select the HARQ process ID of the CG PUSCH when at least one of the following conditions is not satisfied (e.g., when Condition 1-2 is not satisfied). The definition of the first HARQ process ID selection procedure and the second HARQ process ID selection procedure are described in the present disclosure. In some implementations, when at least one of the following conditions is satisfied (e.g., when Condition 1-2 is satisfied), the UE may determine whether to prioritize the HARQ process ID for new transmission over the HARQ process ID for retransmission based on whether the priority of the HARQ process ID for new transmission is higher than the priority of the HARQ process ID for retransmission. In some implementations, the UE may prioritize the HARQ process ID for new transmission over the HARQ process ID for retransmission when at least one of the following conditions is satisfied (e.g., when Condition 1-2 is satisfied) and the priority of the HARQ process ID for new transmission is higher than the priority of the HARQ process ID for retransmission. FIG. 4 is a flowchart illustrating a method for selecting a HARQ process ID of a CG PUSCH, according to an example implementation of the present disclosure. In action 402, a CG PUSCH becomes available for transmission, and the CG configuration that the CG PUSCH corresponds to is configured with cg-RetransmissionTimer In action 404, the UE may determine to select a HARQ process ID of the CG PUSCH due to the cg-RetransmissionTimer being configured. For example, the HARQ process ID of the CG PUSCH may be selected among the HARQ process IDs available for the configured grant configuration that the CG PUSCH corresponds or belongs to. In action 406, the UE may further determine whether to (allow) prioritize the HARQ process ID(s) of initial transmission (e.g., a new transmission) over the HARQ process ID(s) of retransmission when selecting the HARQ process ID of the CG PUSCH, and vice versa, based on at least one of Condition 1-1 to Condition 1-3, described below.

When at least one of Condition 1-1 to Condition 1-3 is satisfied, the UE may perform action 408 and may prioritize the HARQ process ID(s) of new transmission (e.g., initial transmission) over the HARQ process ID(s) of retransmission when selecting a HARQ process ID of the CG PUSCH. On the other hand, when at least one of Condition 1-1 to Condition 1-3 is not satisfied, the UE may perform action 410 and may prioritize the HARQ process ID(s) of retransmission over the HARQ process ID(s) of new transmission (e.g., initial transmission) when selecting a HARQ process ID of the CG PUSCH. In action 410, the UE may set the HARQ process ID of the CG PUSCH to the selected HARQ process ID.

In some implementations, if a UE determines to prioritize the HARQ process ID(s) of initial transmission over the HARQ process ID(s) of retransmission when selecting a HARQ process ID of a CG PUSCH (e.g., action 408), the UE may select a HARQ process ID among the HARQ process ID(s) of the configured grant configuration that the CG PUSCH corresponds or belongs to and for which is available for initial transmission, if any. On the other hand, if there is no HARQ process ID(s) available for initial transmission from the configured grant configuration that the CG corresponds or belongs to, the UE may select a HARQ process ID among the HARQ process ID(s) for retransmission for the configured grant configuration that the CG PUSCH corresponds or belongs to.

Condition 1-1: The UE has at least one HARQ process ID that corresponds to a deprioritized MAC PDU and/or the UE does not have any HARQ process ID that corresponds to a pending MAC PDU.

When a UE needs to select a HARQ process ID for a CG resource, and the UE has at least one HARQ process that corresponds to a deprioritized PDU and/or the UE does not have any HARQ process ID that corresponds to a pending PDU, the UE may prioritize the HARQ process ID for new transmission (e.g., initial transmission) over the HARQ process ID for retransmission. Otherwise, the UE may prioritize the HARQ process ID for retransmission over the HARQ process ID for new transmission.

Condition 1-2: The UE has been configured with at least one IE from IE Category 1.

When a UE needs to select a HARQ process of a CG resource, and the CG resource corresponds to a CG configuration configured with both cg-RetransmissionTimer and autonomousTx, and the UE has at least one HARQ process ID corresponding to a deprioritized MAC PDU (for the CG configuration), the UE may prioritize the HARQ process ID for new transmission over the HARQ process ID for retransmission (e.g., enabling a first HARQ process ID selection procedure) when selecting a HARQ process ID for the CG configuration. Otherwise, the UE may prioritize the HARQ process ID for retransmission over the HARQ process ID for new transmission (e.g., enabling a second HARQ process ID selection procedure) when selecting a HARQ process ID for the CG configuration.

Condition 1-3: The priority level of a HARQ process ID for retransmission is lower than the priority level of a HARQ process ID for initial transmission.

The priority level of a HARQ process ID for initial transmission may be determined by the highest priority among priorities of the MAC CEs and/or LCHs with data available that may be multiplexed/generated in a MAC PDU to be transmitted on the CG PUSCH and/or the highest priority among priorities of the MAC CEs and/or data from a deprioritized (and/or pending) MAC PDU(s) that may be autonomously transmitted on the CG PUSCH.

The priority of a MAC CE may be determined by the priority/channelAccessPriority IE configured for the MAC CE. The priority of an LCH may be determined by the priority/channelAccessPriority IE configured for the LCH. An increasing priority value may indicate a lower priority level. The priority value of an LCH may be configured in the IE that configures the parameters of the LCH (e.g., LogicalChannelConfig IE). The UE may consider the mapping restriction of the MAC CE(s) and/or LCH(s) when multiplexing/generating a MAC PDU using available data from an LCH and/or MAC CE. In this sense, the priority level of the MAC CEs and/or LCHs that do not satisfy the mapping restriction of the CG PUSCH need not be considered. The deprioritized/pending MAC PDU may have already been obtained/generated and stored in the HARQ buffer associated with the CG PUSCH. Moreover, the priority of data from a deprioritized/pending MAC PDU may be determined by the priority/channelAccessPriority IE configured for the LCH where the data comes from. The deprioritized/pending MAC PDU may be intended for transmission on another CG PUSCH that arrives earlier than the PUSCH. The deprioritized/pending MAC PDU(s) has not yet been acknowledged by the network and may be retransmitted on the CG PUSCH. Here, the HARQ process ID(s) of the deprioritized/pending MAC PDU(s) may be referred to as the HARQ process ID(s) of new transmission.

The priority level of a HARQ process ID for retransmission may be determined by the highest priority among priorities of the MAC CEs and/or data from a pending (and/or deprioritized) MAC PDU(s) that may be retransmitted on the CG PUSCH. The deprioritized/pending MAC PDU may have already been obtained/generated and stored in the HARQ buffer associated with the CG PUSCH. Moreover, the priority of data from a deprioritized/pending MAC PDU may be determined by the priority/channelAccessPriority IE configured for the LCH where the data comes from. The pending/deprioritized MAC PDU may be intended for transmission on another CG PUSCH that arrives earlier than the PUSCH. The pending/deprioritized MAC PDU(s) has not yet been acknowledged by the network and may be retransmitted on the CG PUSCH. Here, the HARQ process ID(s) of the pending/deprioritized MAC PDU(s) may be referred to as the HARQ process ID(s) of retransmission.

If the HARQ process ID for initial transmission corresponds to at least one deprioritized PDU and/or the HARQ process ID for retransmission does not correspond to any pending PDU, the HARQ process ID for initial transmission may be considered as having the highest priority level and/or the HARQ process for retransmission may be considered as having the lowest priority level.

If the HARQ process ID for initial transmission does not correspond to any deprioritized PDU and/or the HARQ process ID for retransmission corresponds to at least one pending PDU, the HARQ process ID for retransmission may be considered as having the highest priority level and/or the HARQ process for initial transmission may be considered as having the lowest priority level.

If the priority level of the HARQ process ID for retransmission is equal to the priority level of the HARQ process ID for new transmission, the UE may prioritize the HARQ process ID of retransmission over the HARQ process ID for new transmission when selecting a HARQ process ID of the CG resource.

If the priority level of the HARQ process ID for retransmission is equal to the priority level of the HARQ process ID for new transmission, the UE may prioritize the HARQ process ID of new transmission over the HARQ process ID for retransmission when selecting a HARQ process ID of the CG resource.

In one implementation, when a UE selects a HARQ process ID, the UE may prioritize the HARQ process ID that corresponds to a deprioritized MAC PDU over the HARQ process ID for new transmission (e.g., initial transmission) and/or the HARQ process ID for retransmission. Alternatively, the UE may prioritize the HARQ process ID of a pending MAC PDU over the HARQ process ID of new transmission (e.g., initial transmission) and/or the HARQ process ID of retransmission.

When a UE selects a HARQ process ID of a CG PUSCH, the UE behavior as defined in the implementations in the present section (and/or the present disclosure) may only be applied if at least one of the IEs from IE Category 1 is configured. Otherwise, the UE may follow 3GPP TS 38.321 to prioritize HARQ process ID(s) of retransmission(s) over HARQ process ID(s) of new/initial transmission(s) when selecting a HARQ process ID of the CG PUSCH.

The specific IE from IE Category 1 may be configured per HARQ process, CG configuration, BWP, serving cell, and/or Cell Group (e.g., MAC entity). The specific IE from IE Category 1 may be used for enabling CG-UCI transmission. The specific IE from IE Category 1 may be used for enabling DFI reception. If the specific IE from IE Category 1 is configured, the UE may always prioritize the HARQ process corresponding to a deprioritized/pending MAC PDU over other HARQ process IDs for new transmission/retransmission.

IE Category 1 may include the following IEs, e.g., cg-RetransmissionTimer, configuredGrantTimer, configuredGrantConfigIndex, configuredGrantConfigIndexMAC, ConfiguredGrantConfigToAddModList, autonomousTx, phy-PriorityIndex, allowedCG-List, lch-BasedPrioritization, harq-ProcID-Offset, harq-ProcID-Offset2, lbt-FailureRecoveryConfig, repK-RV, and a specific IE.

In some implementations, when a CG PUSCH becomes available for transmission and a UE needs to select a HARQ process ID for the CG PUSCH, the UE may follow 3GPP TS 38.321 and prioritize the HARQ process ID for retransmission over the HARQ process ID for new transmission. In the present implementation, the UE may consider a HARQ process ID corresponding to a deprioritized MAC PDU as a HARQ process ID for retransmission. Please note that if a HARQ process ID corresponding to a deprioritized MAC PDU is considered for retransmission, the (MAC entity of the) UE may consider the NDI for the HARQ process ID that corresponds to the deprioritized MAC PDU to not have been toggled. As a result, if the deprioritized MAC PDU is transmitted on the CG PUSCH, and CG-UCI indicating the HARQ process ID of the CG PUSCH needs to be transmitted, the UE may not toggle the NDI value in the CG-UCI if a deprioritized PDU is transmitted on the CG PUSCH.

If a UE determines a CG PUSCH as a deprioritized CG PUSCH, the UE may stop the configuredGrantTimer and/or cg-RetransmissionTimer associated with the HARQ process of the CG PUSCH if the CG PUSCH is configured with autonomousTx.

The autonomousTx may be considered as being configured in the UL CG PUSCH if it is configured in the configuredGrantConfig IE that configures the CG PUSCH. The configuredGrantTimer and/or cg-RetransmissionTimer may be configured in the CG PUSCH resource. Please note that configuredGrantTimer/cg-RetransmissionTimer is considered as being configured in the CG PUSCH if it is configured in the configuredGrantConfig IE that configures the CG PUSCH. The configuredGrantTimer/cg-RetransmissionTimer may be stopped if it is running. The UE may determine the CG PUSCH as a deprioritized CG PUSCH after performing LCH-based prioritization. In this case, the (MAC entity of the) UE may need to be configured with lch-basedPrioritization in order to perform LCH-based prioritization.

The UE may determine the CG PUSCH as a deprioritized CG PUSCH if it is cancelled by a high PHY-priority UL transmission (e.g., PUCCH transmission as specified in clause 9 of 3GPP TS 38.213). For example, when a CG PUSCH partially/fully overlaps a UL transmission in the time domain (in the same serving cell), the UE may perform a PHY-based intra-UE prioritization procedure. During the PHY-based intra-UE prioritization procedure, the UE may compare the PHY-priority of the CG PUSCH and the PHY-priority of the UL transmission. For example, the UE may compare the value of the phy-PriorityIndex of the CG PUSCH with the phy-PriorityIndex of the UL transmission. If the CG PUSCH has lower PHY-priority than the UL transmission, the CG PUSCH may be determined as a deprioritized CG PUSCH, and the UL transmission may be determined as a prioritized UL transmission. Consequently, the deprioritized CG PUSCH may be considered as being cancelled by the prioritized UL transmission. The PHY-priority (e.g., phy-PriorityIndex) of the CG PUSCH may be configured in the CG configuration (e.g., configuredGrantConfig IE) that the CG PUSCH corresponds to. The PHY-priority may have two values: a first value (e.g., p1) indicates a high priority and a second value (e.g., p2) indicates low priority.

The UE may determine the CG PUSCH as a deprioritized CG PUSCH may be cancelled by a CI-RNTI as specified in clause 11.2A of 3GPP TS 38.213.

Figure 5:
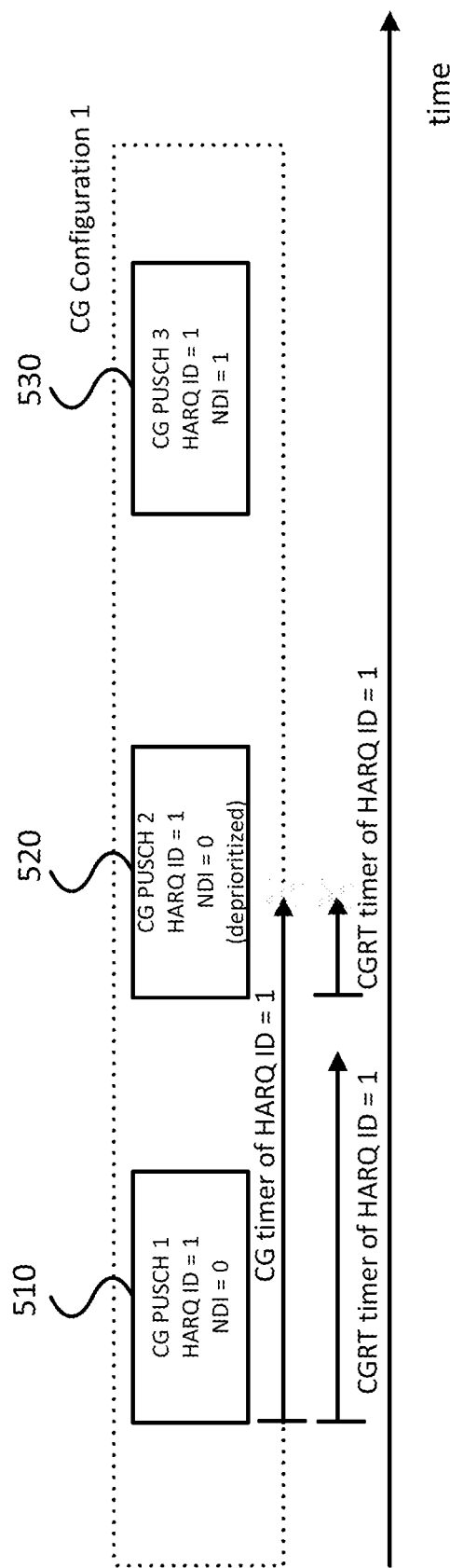
FIG. 5 is a schematic diagram illustrating another issue associated with the autonomous transmission of a deprioritized MAC PDU, according to an example implementation of the present disclosure.

FIG. 5 is a schematic diagram illustrating another issue associated with the autonomous transmission of a deprioritized MAC PDU, according to an example implementation of the present disclosure. An exemplary scenario in FIG. 5 may occur at a UE based on the abovementioned issue statement. Please note that in FIG. 5, configuredGrantTimer and cg-RetransmissionTimer are denoted as CG timer and CGRT timer, respectively. In FIG. 5, a UE is configured with a CG configuration (e.g., CG configuration 1). At least one of autonomousTx, configuredGrantTimer, and cg-RetransmissionTimer may be configured in the CG configuration (e.g., CG configuration 1). Moreover, CG PUSCH 1 (represented by 510 in FIG. 5), CG PUSCH 2 (represented by 520 in FIG. 5), and CG PUSCH 3 (represented by 530 in FIG. 5) may correspond to the CG configuration (e.g., CG configuration 1). If the UE successfully transmits a first MAC PDU on CG PUSCH 1 that corresponds with a HARQ process ID of 1 and an NDI value of 1, the UE may (re)start configuredGrantTimer associated with HARQ process ID of 1 and (re)start cg-RetransmissionTimer associated with HARQ process ID of 1 (e.g., at the beginning of the transmission on CG PUSCH 1). Subsequently, cg-RetransmissionTimer may be expired/stopped before CG PUSCH 2 becomes available. Since configuredGrantTimer of HARQ process ID 1 is running and cg-RetransmissionTimer is not running, the UE may set the HARQ process ID of CG PUSCH 2 to 1 and perform retransmission of the first MAC PDU on CG PUSCH 2. The UE may (re)start cg-RetransmissionTimer associated with HARQ process ID of 1 upon retransmission of the first MAC PDU on CG PUSCH 2 (e.g., at the beginning of the transmission on CG PUSCH 2). Here, the NDI of CG PUSCH 2 may be set to 1 because it is not toggled when compared with the previous UL grant (e.g., CG PUSCH 1) with the same HARQ process (e.g., HARQ process ID of 1). If CG PUSCH 2 is considered as a deprioritized UL resource (while the transmission on CG PUSCH 2 is ongoing), the configuredGrantTimer and cg-RetransmissionTimer of HARQ process 1 may both be stopped. As a result, when another CG resource becomes available after CG PUSCH 2, e.g., CG PUSCH 3, the UE may again set CG PUSCH 3 to HARQ process ID of 1 in order to autonomously transmit the first MAC PDU. The UE may consider the NDI of CG PUSCH 3 to have been toggled when compared with the previous UL grant (e.g., CG PUSCH 2) with the same HARQ process (e.g., HARQ process ID of 1). Consequently, even if the network has already (partially) received the first MAC PDU from CG PUSCH 1, it may not realize that the MAC PDU received in CG PUSCH 3 is also the first MAC PDU, possibly due to a toggled NDI in CG PUSCH 3. This eliminates the opportunity to perform soft combining.

CG PUSCH 1, CG PUSCH 2, and/or CG PUSCH 3 may also correspond to different CG configurations, e.g., retransmission/autonomous transmission may be performed on a CG PUSCH from another CG configuration. The UE may indicate the NDI value, RV value, and HARQ process ID value of a CG PUSCH (e.g., CG PUSCH1, CG PUSCH2, and/or CG PUSCH3) that corresponds to a CG configuration configured with cg-RetransmissionTimer. The NDI value, RV value, and HARQ process ID value may be indicated via CG-UCI that multiplexes with the CG PUSCH.

In some implementations, if a CG configuration of a UE is configured with autonomousTx and configuredGrantTimer, and a CG PUSCH from the CG configuration is considered as a deprioritized CG PUSCH, the UE may determine whether to stop a configuredGrantTimer for the corresponding HARQ process of the deprioritized CG PUSCH based on specific conditions. When at least one of the following Condition 2-1 to Condition 2-4 is satisfied, the UE may consider the HARQ process of the CG PUSCH as pending and/or may not stop the configuredGrantTimer if it is running.

Condition 2-1: cg-RetransmissionTimer is configured in the CG configuration.

Figure 6:
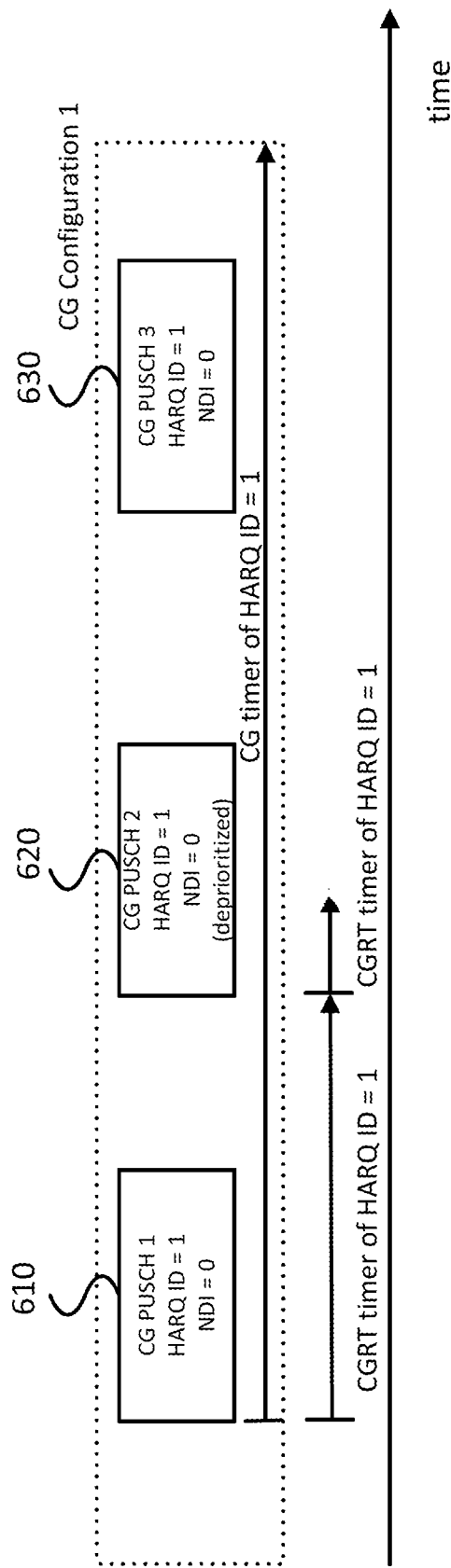
FIG. 6 is a schematic diagram illustrating new conditions to stop the CG timer, according to an example implementation of the present disclosure.

In some implementations, when a UE is configured with a CG configuration that includes autonomousTx and configuredGrantTimer, the UE may, upon a CG PUSCH corresponding to the CG configuration being deprioritized, stop the configuredGrantTimer for the HARQ process of the CG PUSCH if cg-RetransmissionTimer is not configured in the CG configuration. In contrast, the UE may consider the HARQ process of the CG PUSCH as pending and/or may not stop the configuredGrantTimer for the HARQ process of the CG PUSCH if cg-RetransmissionTimer is configured in the CG configuration. FIG. 6 is a schematic diagram illustrating new conditions to stop the CG timer (e.g., configuredGrantTimer), according to an example implementation of the present disclosure. Please note that in FIG. 6, configuredGrantTimer and cg-RetransmissionTimer are denoted as CG timer and CGRT timer, respectively. In FIG. 6, a UE is configured with a CG configuration (e.g., CG configuration 1). At least one of autonomousTx, configuredGrantTimer, and cg-RetransmissionTimer may be configured in the CG configuration (e.g., CG configuration 1). Moreover, CG PUSCH 1 (represented by 610 in FIG. 6), CG PUSCH 2 (represented by 620 in FIG. 6), and CG PUSCH 3 (represented by 630 in FIG. 6) may correspond to the CG configuration (e.g., CG configuration 1). If the UE successfully transmits a first MAC PDU on CG PUSCH 1 that corresponds a HARQ process ID of 1 and an NDI value of 1, the UE may (re)start configuredGrantTimer associated with HARQ process of 1 and (re)start cg-RetransmissionTimer associated with HARQ process ID of 1 (e.g., at the beginning of the transmission on CG PUSCH 1). Subsequently, cg-RetransmissionTimer may be expired/stopped before CG PUSCH 2 becomes available. Since configuredGrantTimer of HARQ process ID 1 is running and cg-RetransmissionTimer is not running, the UE may set the HARQ process ID of CG PUSCH 2 to 1 and perform retransmission of the first MAC PDU on CG PUSCH 2. The UE may (re)start cg-RetransmissionTimer associated with HARQ process ID of 1 upon retransmission of the first MAC PDU on CG PUSCH 2 (e.g., at the beginning of the transmission on CG PUSCH 2). Here, the NDI of CG PUSCH 2 may be set to 1 because it is not toggled when compared with the previous UL grant (e.g., CG PUSCH 1) with the same HARQ process (e.g., HARQ process ID of 1). If CG PUSCH 2 is considered as a deprioritized UL resource (while the transmission on CG PUSCH 2 is ongoing), the cg-RetransmissionTimer of HARQ process 1 may be stopped. However, the configuredGrantTimer of HARQ process 1 may not be stopped. This behavior is different from the behavior in FIG. 5 (e.g., the UE stops both configuredGrantTimer and cg-RetransmissionTimer for the HARQ process of CG PUSCH 2 in FIG. 5 when the UE determines that CG PUSCH 2 in FIG. 5 is deprioritized).

Condition 2-2: cg-RetransmissionTimer for the HARQ process is running when the CG PUSCH is deprioritized.

Condition 2-3: The MAC PDU obtained/generated for transmission on the CG PUSCH has been transmitted before.

In some implementations, when a UE is configured with a CG configuration that includes autonomousTx and configuredGrantTimer, the UE may, upon a first CG PUSCH corresponding to the CG configuration being deprioritized, stop the configuredGrantTimer for the HARQ process of the first CG PUSCH if a MAC PDU obtained/generated for transmission on the first CG PUSCH has not been transmitted on another CG PUSCH. In contrast, the UE may consider the HARQ process of the CG PUSCH as pending and/or may not stop the configuredGrantTimer for the HARQ process if the MAC PDU obtained/generated for transmission on the first CG PUSCH has been transmitted on another CG PUSCH. The other CG PUSCH may occur earlier than the first CG PUSCH. The other CG PUSCH may have the same HARQ process ID as the first CG PUSCH.

Condition 2-4: The CG PUSCH is a repetition within a transmission bundle and/or the CG PUSCH is for retransmission.

The first CG PUSCH may be considered for repetition within a transmission bundle and/or for retransmission if the NDI of the first CG PUSCH is not toggled when compared with the NDI from a previously transmitted CG PUSCH that has the same HARQ process ID as the first CG PUSCH.

In some implementations, when a UE is configured with a CG configuration that includes autonomousTx and configuredGrantTimer, the UE may, upon a first CG PUSCH corresponding to the CG configuration being deprioritized, stop the configuredGrantTimer for the HARQ process if the first CG PUSCH is for new transmission. In contrast, the UE may consider the HARQ process of the CG PUSCH as pending and/or may not stop the configuredGrantTimer for the HARQ process if the first CG PUSCH is within a transmission bundle and/or the first CG PUSCH is for retransmission.

In some implementations, if a CG configuration of a UE is configured with at least one of lch-BasedPrioritization, cg-RetransmissionTimer, autonomousTx, and configuredGrantTimer, and a first CG PUSCH corresponding to the CG configuration becomes available, the UE may determine whether to toggle the NDI value for the HARQ process of the first CG PUSCH based on certain conditions. The UE may consider the NDI value for the HARQ process of the CG PUSCH not to have been toggled if the following Condition 3-1 is satisfied.

Condition 3-1: The first CG PUSCH may be used to transmit a MAC PDU from a second CG PUSCH, which was considered as a deprioritized CG PUSCH.

The second CG PUSCH may occur earlier than the first CG PUSCH. The second CG PUSCH may have the same HARQ process ID as the first CG PUSCH. The second CG PUSCH may be considered as a deprioritized CG PUSCH as a result of intra-UE prioritization. The second CG PUSCH may correspond to the same or different CG configuration as the first CG PUSCH. The MAC PDU may have been generated/obtained for the second CG PUSCH but was not successfully transmitted on the second CG PUSCH. However, the MAC PDU may have been transmitted on another CG PUSCH that occurs before the second CG PUSCH. The second CG PUSCH may be used for repetition within a transmission bundle and/or used for retransmission. The second CG PUSCH may be considered for repetition within a transmission bundle and/or for retransmission if the NDI of the first CG PUSCH is not toggled when compared with the NDI from a previously transmitted CG PUSCH that has the same HARQ process ID as the first CG PUSCH.

In some implementations, when a UE is configured with a CG configuration that includes autonomousTx and configuredGrantTimer, the UE may, upon a first CG PUSCH corresponding to the CG configuration becomes available, consider the NDI value for the HARQ process of the CG PUSCH not to have been toggled if the first CG PUSCH may be used to transmit a MAC PDU from a deprioritized CG PUSCH, namely the second CG PUSCH. Moreover, the MAC PDU may have been transmitted on another CG PUSCH that occurs before the second CG PUSCH.

The configuredGrantTimer and/or cg-RetransmissionTimer for the HARQ process of the first CG PUSCH may not be running when the first CG PUSCH becomes available. The HARQ process of the first CG PUSCH may not be considered as pending when the first CG PUSCH becomes available. The UE may transmit CG-UCI to indicate the HARQ process ID of the first CG PUSCH. Moreover, the NDI value included in the CG-UCI may not be toggled.

Consider a case where a first CG PUSCH corresponding to a CG configuration becomes available, and the first CG PUSCH corresponds to a first HARQ process ID. If LBT failure is detected for the first CG PUSCH, the first HARQ process ID may be considered as pending due to the detection LBT failure indication before transmission on the first CG PUSCH. A first MAC PDU that has been generated and intended for transmission on the first CG PUSCH may be stored in the HARQ buffer associated with the first HARQ process ID. As a result, the cg-RetransmissionTimer and the configuredGrantTimer of the first HARQ process ID may not be (re)started because transmission of the first MAC PDU is not performed by the UE on the first CG PUSCH. Subsequently, when a second CG PUSCH becomes available, the UE may set a HARQ process ID of the second CG PUSCH to the first HARQ process ID in order to retransmit the first MAC PDU on the second CG PUSCH. However, it is possible that the second CG PUSCH is considered as a deprioritized CG PUSCH as a result of intra-UE based prioritization (e.g., LCH-based prioritization or PHY-based prioritization). Consequently, the first HARQ process ID may be considered as both pending and deprioritized. Finally, when a third CG PUSCH becomes available, whether/how to transmit the MAC PDU on the third CG PUSCH may need to be defined at the UE. An approach may be keeping only one type of state variable for the first HARQ process (e.g., either pending/not pending or deprioritized/not deprioritized). Another approach may be treating the first HARQ process as either a HARQ process ID for retransmission or a HARQ process ID for new transmission.

In some implementations, the first CG PUSCH may occur earlier than the second CG PUSCH, and the second CG PUSCH may occur earlier than the third CG PUSCH. In some implementations, the first, the second, and/or the third CG PUSCH may correspond to the same/different CG configuration.

In some implementations, a UE may be configured with a CG configuration that is configured with cg-RetransmissionTimer. When a first CG PUSCH that corresponds to the CG configuration becomes available, the (HARQ entity of the) UE may determine a first HARQ process (e.g., with a first HARQ process ID) for the CG PUSCH and obtain/generate a MAC PDU for transmission on the first CG PUSCH. However, if an LBT failure indication is received from a lower layer (e.g., PHY layer), the UE may consider the first HARQ process of the CG PUSCH as pending. Subsequently, the (HARQ entity of the) UE may consider the first HARQ process as not pending when at least one of the following Conditions 4-1 and 4-2 is satisfied. Please note that pending and not pending may be considered as an internal state variable of the UE. Such a state variable may be maintained in the (MAC entity of) the UE.

Condition 4-1: The first HARQ process is considered as being deprioritized.

In some implementations, the first HARQ process may be considered as being deprioritized if a second CG PUSCH used for transmitting the MAC PDU is being deprioritized. The second CG PUSCH may have the same HARQ process ID as the first CG PUSCH. The second CG PUSCH may occur before or after the first CG PUSCH. The second CG PUSCH may correspond to the same/different CG configuration as the first CG PUSCH.

Condition 4-2: At least one of the IEs from IE Category 1, as described above, is configured in (the CG configuration of) the UE.

In some implementations, a UE may be configured with a CG configuration that is configured with lch-BasedPrioritization and/or autonomousTx. When a first CG PUSCH that corresponds to the CG configuration becomes available, the (HARQ entity of the) UE may determine a first HARQ process (e.g., with a first HARQ process ID) for the CG PUSCH and obtain/generate a MAC PDU for transmission on the first CG PUSCH. However, the first HARQ process may be considered as being deprioritized if the first CG PUSCH is considered as a deprioritized CG PUSCH as a result of intra-UE prioritization. Subsequently, the (HARQ entity of the) UE may consider the first HARQ process as not being deprioritized when at least one of the following Conditions 5-1 to 5-3 is satisfied. Please note that being deprioritized and not being deprioritized may be considered as an internal state variable of the UE. Such a state variable may be maintained in the (MAC entity of) the UE.

Condition 5-1: The first HARQ process ID is considered as pending.

In some implementations, the first HARQ process may be considered as pending if an LBT failure indication is received when a second CG PUSCH becomes available for transmitting the MAC PDU. Transmission on the second CG PUSCH may not be performed due to the reception of an LBT failure indication from a lower layer (e.g., PHY layer). The second CG PUSCH may have the same HARQ process ID as the first CG PUSCH. The second CG PUSCH may occur before or after the first CG PUSCH. The second CG PUSCH may correspond to the same/different CG configuration as the first CG PUSCH.

Condition 5-2: At least one of the IEs from IE Category 1, as described above, is configured in (the CG configuration of) the UE.

Condition 5-3: The UE receives DFI that corresponds to the first HARQ process.

In some implementations, the DFI may indicate ACK (or NACK) for the corresponding HARQ process. In some implementations, a UE may determine a HARQ process of a UL resource as being deprioritized if the UL resource is determined, by the UE, as a deprioritized UL resource. However, the UL resource may be reconsidered, by the UE, as not being deprioritized if the UE receives DFI from the network, and the DFI indicates an ACK for the HARQ process. The UL resource may be a CG PUSCH, a PUSCH scheduled by a dynamic UL grant, etc.

In some implementations, when a first CG PUSCH (for new transmission) with a first HARQ process ID becomes available at a UE, the UE may use the first CG PUSCH to transmit a deprioritized MAC PDU with the first HARQ process if DFI indicating ACK (or NACK) has not been received for the first HARQ process ID. In contrast, the UE may not use the first CG PUSCH to transmit a deprioritized MAC PDU associated with the first HARQ process if DFI indicating ACK (or NACK) has been received for the first HARQ process ID.

The HARQ process ID of the first CG PUSCH may be determined by a UE-specific implementation when cg-RetransmissionTimer is configured at the CG configuration that corresponds to the first CG PUSCH. The deprioritized MAC PDU may be stored in the HARQ buffer associated with the first HARQ process ID. The deprioritized MAC PDU may match the size (e.g., TBS) of the first CG PUSCH. The deprioritized MAC PDU may be intended for transmission on a second CG PUSCH that occurs earlier than the first CG PUSCH, and the second CG PUSCH may be considered as a deprioritized CG PUSCH as a result of intra-UE prioritization. Moreover, the second PUSCH and the first PUSCH may correspond to the same HARQ process ID (e.g., first HARQ process ID) with the same/different CG configuration.

In some implementations, if a CG PUSCH corresponding to a CG configuration becomes available at a UE, a UE may select a HARQ process ID for the CG PUSCH. If the UE selects a first HARQ process ID for the CG resource, and the first HARQ process ID is considered as being deprioritized and pending, the UE may determine whether to autonomously transmit or retransmit a MAC PDU associated with the first HARQ process ID. In some implementations, the UE may autonomously transmit the MAC PDU if the first HARQ process ID is considered as being deprioritized after it is considered as pending. In one case, the UE may retransmit the MAC PDU if the first HARQ process ID is considered as pending after it is considered as being deprioritized.

In some implementations, the MAC PDU may be stored in the HARQ buffer associated with the first HARQ process ID. In some implementations, the CG configuration may be configured with at least one of configuredGrantTimer, cg-RetransmissionTimer, autonomousTx, and lch-BasedPrioritization. If configuredGrantTimer is configured at the CG configuration, the configuredGrantTimer for the HARQ process of the CG PUSCH may or may not be running when the CG PUSCH becomes available. If cg-RetransmissionTimer is configured at the CG configuration, the cg-RetransmissionTimer for the HARQ process of the CG PUSCH may or may not be running when the CG PUSCH becomes available.

In some implementations, if the UE determines to autonomously transmit the MAC PDU, the UE may perform at least one of the following actions (a)-(c).

(a) the UE may apply IIoT-based repetition parameters (e.g., pusch-RepTypeIndicator-r16 and REPETITION_NUMBER, numberOfRepetitions) corresponding to the CG configuration when transmitting repetition of the CG PUSCH within a bundle.

(b) the UE may ignore the NR-U-based repetition parameters (e.g., cg-nrofPUSCH-InSlot-r16 and cg-nrofSlots-r16) corresponding to the CG configuration when transmitting repetition of the CG PUSCH within a bundle.

(c) the UE may consider the NDI bit for the first HARQ process ID to have been toggled (when comparing with the previously received scheduling with the same HARQ process ID). The UE may transmit CG-UCI that indicates the HARQ process ID of the CG PUSCH, and the NDI in the CG-UCI is toggled for the HARQ process ID.

In some implementations, if the UE determines to retransmit the MAC PDU, the UE may perform at least one of the following actions (a)-(c). The UE may determine to retransmit the MAC PDU on a CG PUSCH corresponding to the CG configuration if the UE is configured with cg-RetransmissionTimer on the CG configuration.

(a) the UE may apply NR-U-based repetition parameters (e.g., cg-nrofPUSCH-InSlot-r16 and cg-nrofSlots-r16) corresponding to the CG configuration when transmitting repetition of the CG PUSCH within a bundle.

(b) the UE may ignore the IIoT-based repetition parameters (e.g., pusch-RepTypeIndicator-r16 and REPETITION_NUMBER, numberOfRepetitions) corresponding to the CG configuration when transmitting repetition of the CG PUSCH within a bundle. That is to say, the UE may not be expected to be configured, from the network, with the IIoT-based repetition parameters (e.g., pusch-RepTypeIndicator-r16 and REPETITION_NUMBER, numberOfRepetitions) corresponding to the CG configuration when the UE is allowed to retransmit the MAC PDU on the CG configuration due to cg-RetransmissionTimer being configured. In other words, the network may not configure IIoT-based repetition parameters (e.g., pusch-RepTypeIndicator-r16 and REPETITION_NUMBER, numberOfRepetitions) and cg-RetransmissionTimer to a UE simultaneously (in the same CG configuration).

(c) the UE may consider the NDI bit for the first HARQ process ID not to have been toggled. The UE may transmit CG-UCI that indicates the HARQ process ID of the CG PUSCH, and the NDI in the CG-UCI is not toggled for the HARQ process ID.

Figure 7:
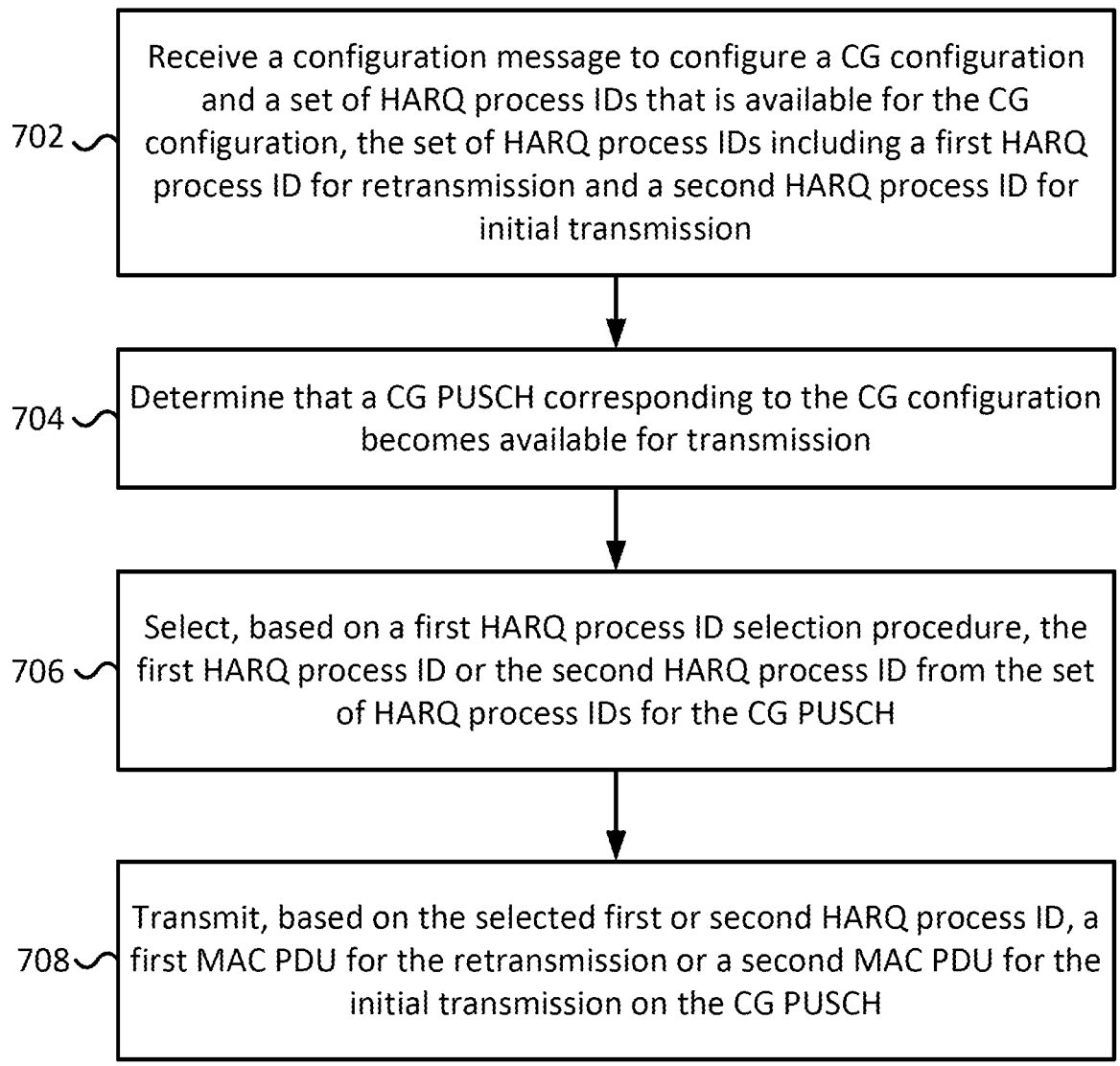
FIG. 7 is a flowchart illustrating a method for a UE for HARQ ID selection, according to an example implementation of the present disclosure

FIG. 7 is a flowchart illustrating a method 700 for a UE for HARQ ID selection according to an example implementation of the present disclosure. Although actions 702, 704, 706, and 708 are illustrated as separate actions represented as independent blocks in FIG. 7, these separately illustrated actions should not be construed as necessarily order-dependent. The order in which the actions are performed in FIG. 7 is not intended to be construed as a limitation, and any number of the disclosed blocks may be combined in any order to implement the method, or an alternate method. Moreover, each of actions 702, 704, 706, and 708 may be performed independently of other actions and can be omitted in some implementations of the present disclosure.

In action 702, the UE may receive a configuration message to configure a Configured Grant (CG) configuration and a set of HARQ process IDs that is available for the CG configuration. The set of HARQ process IDs may include a first HARQ process ID for retransmission and a second HARQ process ID for initial transmission.

In action 704, the UE may determine that a CG PUSCH corresponding to the CG configuration becomes available for transmission.

In action 706, the UE may select, based on a first HARQ process ID selection procedure, the first HARQ process ID or the second HARQ process ID from the set of HARQ process IDs for the CG PUSCH. The first HARQ process ID selection procedure may include: determining a priority of first data multiplexed in the first MAC PDU as a first priority of the first HARQ process ID; determining a priority of second data to be multiplexed in the second MAC PDU as a second priority of the second HARQ process ID; selecting, based on the first priority and the second priority, the first HARQ process ID or the second HARQ process ID from the set of HARQ process IDs for the CG PUSCH; and prioritizing the first HARQ process ID over the second HARQ process ID in a case that the first priority is equal to the second priority.

In some implementations, the first data may be from a first set of Logical Channels (LCHs), the second data may be from a second set of LCHs, the priority of the first data may be determined based on an LCH with a highest LCH priority among the first set of LCHs, and the priority of the second data may be determined based on an LCH with a highest LCH priority among the second set of LCHs.

In some implementations, the first HARQ process ID selection procedure may further include: selecting the first HARQ process ID from the set of HARQ process IDs for the CG PUSCH in a case that the first priority is higher than the second priority; and selecting the second HARQ process ID from the set of HARQ process IDs for the CG PUSCH in a case that the second priority is higher than the first priority.

In some implementations, the UE may select, based on the first HARQ process ID selection procedure, the first HARQ process ID or the second HARQ process ID from the set of HARQ process IDs for the CG PUSCH in a case that a Logical Channel (LCH)-based prioritization indication, a CG retransmission timer, and an Information Element (IE) for enabling the first HARQ process ID selection procedure are configured. In some implementations, the IE may be configured for the CG configuration or for a MAC entity of the UE. In some implementations, the UE may select, based on a second HARQ process ID selection procedure, the first HARQ process ID or the second HARQ process ID from the set of HARQ process IDs for the CG PUSCH in a case that at least one of the LCH-based prioritization indication, the CG retransmission timer, and the IE is not configured. The second HARQ process ID selection procedure may include: prioritizing the first HARQ process ID over the second HARQ process ID. In some implementations, the UE prioritizes the first HARQ process ID over the second HARQ process ID may mean that the UE selects the first HARQ process ID for the CG PUSCH rather than the second HARQ process ID.

In action 708, the UE may transmit, based on the selected first or second HARQ process ID, a first Medium Access Control (MAC) Protocol Data Unit (PDU) for retransmission or a second MAC PDU for initial transmission on the CG PUSCH.

By enabling the first HARQ process ID selection procedure in a CG configuration, the UE is allowed to select a HARQ process ID of a CG PUSCH corresponding to the CG configuration based on the priority of the HARQ process ID.

In some implementations, based on the first HARQ process ID selection procedure, the UE may select a HARQ process ID with the highest priority among the one or more HARQ process IDs available for the CG configuration. In some implementations, the HARQ process ID may be a HARQ process ID for retransmission if a MAC PDU corresponding to the HARQ process ID was not successfully transmitted on a CG PUSCH on the CG configuration, and the MAC PDU is stored in a HARQ buffer corresponding to the HARQ process ID. In some implementations, the HARQ process ID may be a HARQ process ID for new transmission if the HARQ process ID has not been occupied. Based on the first HARQ process ID selection procedure, when a HARQ process ID is for retransmission, the priority of the HARQ process ID may be determined by the highest priority among the priorities of the LCHs that are multiplexed in a MAC PDU which was not successfully transmitted (and is still stored in the HARQ buffer corresponding to the HARQ process ID). On the other hand, when a HARQ process ID is for new transmission, the priority of the HARQ process ID may be determined by the highest priority among the priorities of the LCHs with data available that can be used for generating/multiplexing a MAC PDU for new transmission. In this sense, with the first HARQ process ID selection procedure being enabled, the UE may select a HARQ process ID for either new transmission or retransmission of a MAC PDU that includes the most important data (e.g., data from an LCH with the highest priority).

In some implementations, when the first HARQ process ID selection procedure is enabled in a CG configuration, the UE may, upon determining a group of more than one HARQ process ID with equally highest priority among the one or more HARQ process IDs available for the CG configuration, prioritize the HARQ process ID for retransmission over the HARQ process ID for new transmission from the group. In other words, when the group of more than one HARQ process ID with equally highest priority consists of a HARQ process ID for new transmission and a HARQ process ID for retransmission, the UE may select the HARQ process ID for retransmission for a CG PUSCH. The reason is that the HARQ process ID for retransmission corresponds to a MAC PDU which has not been successfully transmitted before. In order to ensure the latency requirement of the data in the MAC PDU is met, the UE may prioritize the HARQ process ID for retransmission in order to perform retransmission of the MAC PDU first.

Figure 8:
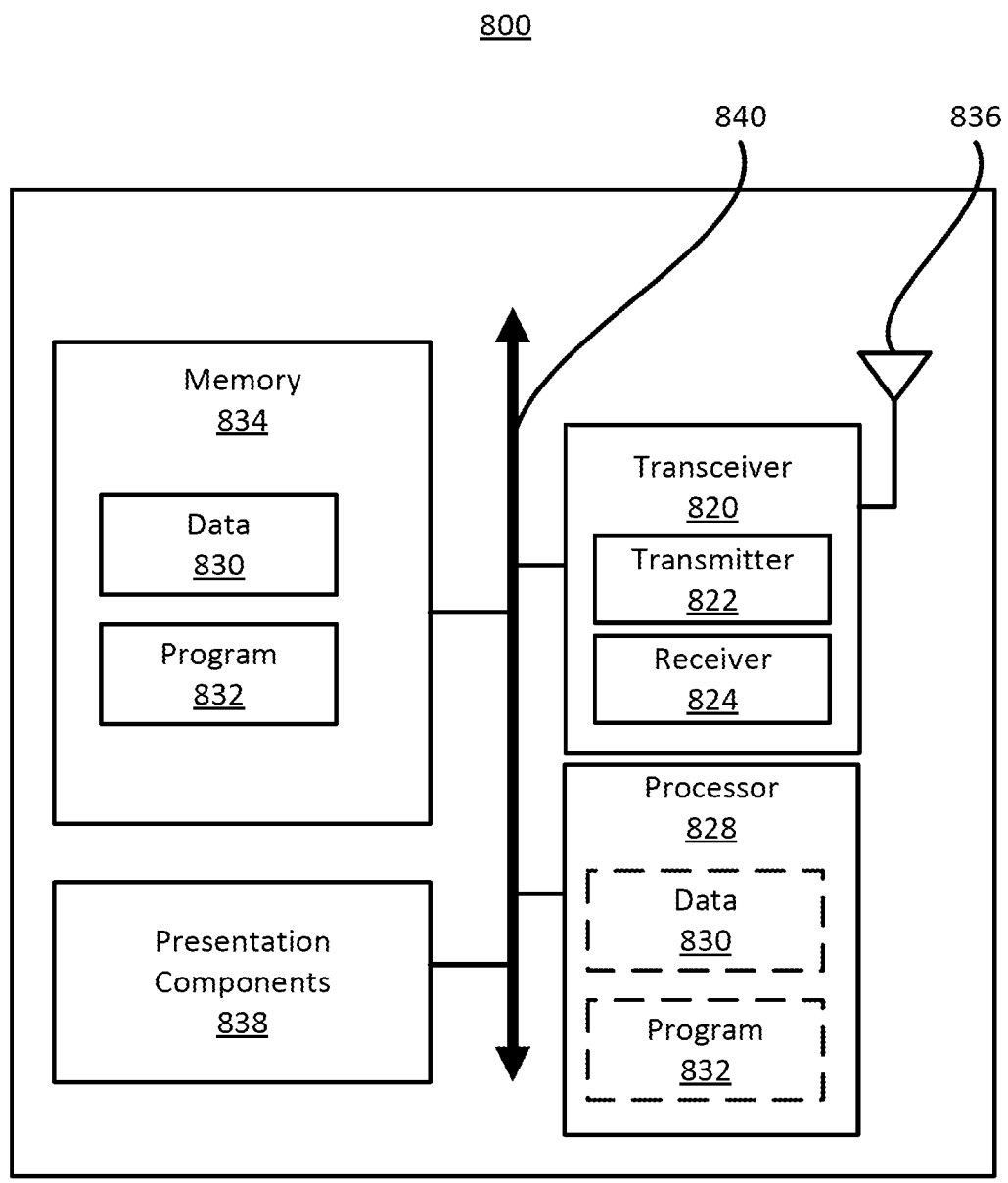
FIG. 8 is a block diagram illustrating a node for wireless communication, according to an example implementation of the present disclosure.

FIG. 8 is a block diagram illustrating a node 800 for wireless communication according to an example implementation of the present disclosure. As illustrated in FIG. 8, a node 800 may include a transceiver 820, a processor 828, a memory 834, one or more presentation components 838, and at least one antenna 836. The node 800 may also include a radio frequency (RF) spectrum band module, a BS communications module, a network communications module, and a system communications management module, Input/Output (I/O) ports, I/O components, and a power supply (not illustrated in FIG. 8).

Each of the components may directly or indirectly communicate with each other over one or more buses 840. The node 800 may be a UE or a BS that performs various functions disclosed with reference to FIG. 7.

The transceiver 820 has a transmitter 822 (e.g., transmitting/transmission circuitry) and a receiver 824 (e.g., receiving/reception circuitry) and may be configured to transmit and/or receive time and/or frequency resource partitioning information. The transceiver 820 may be configured to transmit in different types of subframes and slots including but not limited to usable, non-usable, and flexibly usable subframes and slot formats. The transceiver 820 may be configured to receive data and control channels.

The node 800 may include a variety of computer-readable media. Computer-readable media may be any available media that may be accessed by the node 800 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared, and other wireless media. Combinations of any of the previously listed components should also be included within the scope of computer-readable media.

The memory 834 may include computer-storage media in the form of volatile and/or non-volatile memory. The memory 834 may be removable, non-removable, or a combination thereof. Example memory may include solid-state memory, hard drives, optical-disc drives, etc. As illustrated in FIG. 8, the memory 834 may store a computer-readable and/or computer-executable program 832 (e.g., software codes) that are configured to, when executed, cause the processor 828 to perform various functions disclosed herein, for example, with reference to FIG. 7. Alternatively, the program 832 may not be directly executable by the processor 828 but may be configured to cause the node 800 (e.g., when compiled and executed) to perform various functions disclosed herein.

The processor 828 (e.g., having processing circuitry) may include an intelligent hardware device (e.g., a Central Processing Unit (CPU), a microcontroller, an ASIC, etc). The processor 828 may include memory. The processor 828 may process the data 830 and the program 832 received from the memory 834, and information transmitted and received via the transceiver 820, the base band communications module, and/or the network communications module. The processor 828 may also process information to send to the transceiver 820 for transmission via the antenna 836 to the network communications module for transmission to a CN.

One or more presentation components 838 may present data indications to a person or another device. Examples of presentation components 838 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method performed by a User Equipment (UE) for Hybrid Automatic Repeat Request (HARQ) process Identity (ID) selection, the method comprising:
   receiving a configuration message to configure a Configured Grant (CG) configuration and a set of HARQ process IDs that is available for the CG configuration, the set of HARQ process IDs including a first HARQ process ID and a second HARQ process ID;
   determining a CG physical uplink shared channel (PUSCH) corresponding to the CG configuration;
   selecting, based on a first HARQ process ID selection procedure, the first HARQ process ID or the second HARQ process ID for the CG PUSCH in a case that a Logical Channel (LCH)-based prioritization indication, a CG retransmission timer, and an Information Element (IE) for enabling the first HARQ process ID selection procedure are configured; and
   transmitting, based on the selected first or second HARQ process ID, a first Medium Access Control (MAC) Protocol Data Unit (PDU) for retransmission or a second MAC PDU for initial transmission on the CG PUSCH, wherein the first HARQ process ID selection procedure includes:
      determining a priority of first data multiplexed in the first MAC PDU as a first priority of the first HARQ process ID;
      determining a priority of second data to be multiplexed in the second MAC PDU as a second priority of the second HARQ process ID;
      selecting, based on the first priority and the second priority, the first HARQ process ID or the second HARQ process ID for the CG PUSCH; and
      prioritizing the first HARQ process ID over the second HARQ process ID in a case that the first priority is equal to the second priority.

2. The method of claim 1, wherein:
   the first data is from a first set of LCHs,
   the second data is from a second set of LCHs,
   the priority of the first data is determined based on an LCH with a highest LCH priority among the first set of LCHs, and
   the priority of the second data is determined based on an LCH with a highest LCH priority among the second set of LCHs.

3. The method of claim 1, wherein the first HARQ process ID selection procedure further includes:
   selecting the first HARQ process ID for the CG PUSCH in a case that the first priority is higher than the second priority; and
   selecting the second HARQ process ID for the CG PUSCH in a case that the second priority is higher than the first priority.

4. The method of claim 1, wherein the IE is configured for the CG configuration or for a MAC entity of the UE.

5. The method of claim 1, further comprising:
selecting, based on a second HARQ process ID selection procedure, the first HARQ process ID or the second HARQ process ID for the CG PUSCH in a case that at least one of the LCH-based prioritization indication, the CG retransmission timer, and the IE is not configured, wherein the second HARQ process ID selection procedure includes:
prioritizing the first HARQ process ID over the second HARQ process ID.

6. The method of claim 5, wherein prioritizing the first HARQ process ID over the second HARQ process ID comprises:
selecting the first HARQ process ID for the CG PUSCH.

7. A User Equipment (UE) for Hybrid Automatic Repeat Request (HARQ) process Identity (ID) selection, the UE comprising:
at least one processor; and
at least one non-transitory computer-readable medium coupled to the at least one processor and storing one or more computer-executable instructions that, when executed by the at least one processor, cause the UE to:
receive a configuration message to configure a Configured Grant (CG) configuration and a set of HARQ process IDs that is available for the CG configuration, the set of HARQ process IDs including a first HARQ process ID and a second HARQ process ID;
determine a CG physical uplink shared channel (PUSCH) corresponding to the CG configuration;
select, based on a first HARQ process ID selection procedure, the first HARQ process ID or the second HARQ process ID for the CG PUSCH in a case that a Logical Channel (LCH)-based prioritization indication, a CG retransmission timer, and an Information Element (IE) for enabling the first HARQ process ID selection procedure are configured; and
transmit, based on the selected first or second HARQ process ID, a first Medium Access Control (MAC) Protocol Data Unit (PDU) for retransmission or a second MAC PDU for initial transmission on the CG PUSCH, wherein the first HARQ process ID selection procedure includes:
determining a priority of first data multiplexed in the first MAC PDU as a first priority of the first HARQ process ID;
determining a priority of second data to be multiplexed in the second MAC PDU as a second priority of the second HARQ process ID;
selecting, based on the first priority and the second priority, the first HARQ process ID or the second HARQ process ID for the CG PUSCH; and
prioritizing the first HARQ process ID over the second HARQ process ID in a case that the first priority is equal to the second priority.

8. The UE of claim 7, wherein:
the first data is from a first set of LCHs,
the second data is from a second set of LCHs,
the priority of the first data is determined based on an LCH with a highest LCH priority among the first set of LCHs, and
the priority of the second data is determined based on an LCH with a highest LCH priority among the second set of LCHs.

9. The UE of claim 7, wherein the first HARQ process ID selection procedure further includes:
selecting the first HARQ process ID for the CG PUSCH from the set of HARQ process IDs in a case that the first priority is higher than the second priority; and
selecting the second HARQ process ID for the CG PUSCH in a case that the second priority is higher than the first priority.

10. The UE of claim 7, wherein the IE is configured for the CG configuration or for a MAC entity of the UE.

11. The UE of claim 7, wherein the one or more computer-executable instructions, when executed by the at least one processor, further cause the UE to:
select, based on a second HARQ process ID selection procedure, the first HARQ process ID or the second HARQ process ID for the CG PUSCH in a case that at least one of the LCH-based prioritization indication, the CG retransmission timer, and the IE is not configured, wherein the second HARQ process ID selection procedure includes:
prioritizing the first HARQ process ID over the second HARQ process ID.

12. The UE of claim 11, wherein prioritizing the first HARQ process ID over the second HARQ process ID comprises:
selecting the first HARQ process ID for the CG PUSCH.

* * * * *